United States Patent [19]
Wakai et al.

[11] Patent Number: 5,973,722
[45] Date of Patent: Oct. 26, 1999

[54] COMBINED DIGITAL AUDIO/VIDEO ON DEMAND AND BROADCAST DISTRIBUTION SYSTEM

[75] Inventors: Bruce Minoru Wakai, Cypress; Robert Troxel, Brea; Marc Booth, La Habra; Kaz Takata, Placentia; Karen Evensen, Lake Forest; Loi Ninh, Ranch, all of Calif.

[73] Assignees: Sony Corporation, Tokyo, Japan; Sony Trans Com Inc., Irvine, Calif.

[21] Appl. No.: 08/716,541

[22] Filed: Sep. 16, 1996

[51] Int. Cl.$^6$ ....................................................... H04N 7/16
[52] U.S. Cl. .................................................. 348/8; 455/6.3
[58] Field of Search ........................... 348/7, 8, 12, 705, 348/722; 455/3.1, 6.3, 6.1

[56] References Cited

U.S. PATENT DOCUMENTS

| | | | |
|---|---|---|---|
| 3,795,771 | 3/1974 | Gunderson et al. | 179/15 A |
| 4,352,124 | 9/1982 | Kline | 358/60 |
| 4,352,200 | 9/1982 | Oxman | 455/41 |
| 4,428,078 | 1/1984 | Kuo | 455/3 |
| 4,584,603 | 4/1986 | Harrison | 358/86 |
| 4,647,980 | 3/1987 | Steventon et al. | 358/254 |
| 4,756,528 | 7/1988 | Umashankar | 273/1 E |
| 4,763,360 | 8/1988 | Daniels et al. | 455/3 |
| 4,774,514 | 9/1988 | Hildebrandt et al. | 340/971 |
| 4,835,604 | 5/1989 | Kondo et al. | 348/8 |
| 4,853,555 | 8/1989 | Wheat | 307/9.1 |
| 4,866,515 | 9/1989 | Tagawa et al. | 358/86 |

(List continued on next page.)

FOREIGN PATENT DOCUMENTS

| | | | |
|---|---|---|---|
| 0 577054 | 1/1994 | European Pat. Off. | H04N 7/18 |
| 0 631247 | 12/1994 | European Pat. Off. | G06F 15/44 |
| 0 789502 | 8/1997 | European Pat. Off. | H04Q 11/04 |

OTHER PUBLICATIONS

R. H. J. Bloks, "The IEEE–1394 High Speed Serial Bus," Philips Journal of Research, vol. 50, No. 1/2, pp. 209–216, Feb. 1996–Jul. 1996, The Netherlands.

I. Harbison, "Step Change," Inflight, pp. 16–18, Mar. 1996.

I. Harbison & G. Dunn, "Two–Way Street," Inflight, pp. 14–15, Mar. 1996.

A. L. Velocci, Jr., "Airframers Force Discipline in High–Stakes IFE Market," Aviation Week & Space Technology, pp. 41–43, Mar. 25, 1996.

"In–Flight Entertainment—Flight Newsletters," Reed Business Publishing, Jan. 9, 1996.

(List continued on next page.)

*Primary Examiner*—Chris Grant
*Attorney, Agent, or Firm*—Haverstock & Owens LLP

[57] ABSTRACT

An in-flight passenger entertainment system has a first digital network for communication among components of a headend system including a data server, media controller, one or more media servers, system interface unit, system manager unit and attendant control panel. The in-flight entertainment system is coupled to an aircraft's existing systems through the system interface unit and the system manager unit. The components of the headend system are all coupled to a network switch for routing data within the first network. The network switch is also coupled to one or more zone bridge units, each of which is coupled to multiple seat electronics units. The zone bridge units and the seat electronics units together form a second digital network. The first digital network is preferably an ATM network with fibre optic cables used to carry the data. The second digital network is preferably an IEEE 1394 serial bus network. The zone bridge units control all communications between the networks, converting all communications into the format required by the respective network. A first audio path for transmitting audio content from the headend system is routed to predetermined seat entertainment units through the network switch and the zone bridge units. A second audio path for transmitting audio from the system interface unit is routed to the seat entertainment units through the zone bridge units.

24 Claims, 16 Drawing Sheets

U.S. PATENT DOCUMENTS

| | | | |
|---|---|---|---|
| 4,887,152 | 12/1989 | Matsuzaki et al. | 358/86 |
| 4,896,209 | 1/1990 | Matsuzaki et al. | 358/86 |
| 4,897,714 | 1/1990 | Ichise et al. | 358/86 |
| 4,920,432 | 4/1990 | Eggers et al. | 360/33.1 |
| 4,975,696 | 12/1990 | Salter, Jr. et al. | 340/973 |
| 5,123,015 | 6/1992 | Brady, Jr. et al. | 370/112 |
| 5,214,505 | 5/1993 | Rabowsky et al. | 358/86 |
| 5,220,419 | 6/1993 | Sklar et al. | 358/86 |
| 5,289,272 | 2/1994 | Rabowsky et al. | 348/8 |
| 5,311,302 | 5/1994 | Berry et al. | 348/14 |
| 5,347,632 | 9/1994 | Filepp et al. | 395/200 |
| 5,404,567 | 4/1995 | DePietro et al. | 455/6.3 |
| 5,412,376 | 5/1995 | Chujo et al. | 370/397 |
| 5,414,455 | 5/1995 | Hooper et al. | 348/7 |
| 5,442,390 | 8/1995 | Hooper et al. | 348/7 |
| 5,517,508 | 5/1996 | Scott | 371/37.1 |
| 5,529,265 | 6/1996 | Sakurai | 244/118.5 |
| 5,539,448 | 7/1996 | Verhille et al. | 348/6 |
| 5,555,466 | 9/1996 | Scribner et al. | 348/8 |
| 5,557,541 | 9/1996 | Schulhof et al. | 364/514 R |
| 5,568,180 | 10/1996 | Okamoto | 348/7 |
| 5,568,484 | 10/1996 | Margis | 348/6 |
| 5,572,442 | 11/1996 | Schulhof et al. | 364/514 C |
| 5,581,270 | 12/1996 | Smith et al. | 345/2 |
| 5,586,937 | 12/1996 | Menashe | 463/41 |
| 5,594,924 | 1/1997 | Ottesen et al. | 395/851 |
| 5,596,647 | 1/1997 | Wakai et al. | 381/77 |
| 5,608,447 | 3/1997 | Farry et al. | 348/7 |
| 5,608,448 | 3/1997 | Smoral et al. | 348/7 |
| 5,612,730 | 3/1997 | Lewis | 348/8 |
| 5,617,331 | 4/1997 | Wakai et al. | 348/8 |
| 5,631,693 | 5/1997 | Wunderlich et al. | 348/7 |
| 5,631,694 | 5/1997 | Aggarwal et al. | 348/7 |
| 5,634,012 | 5/1997 | Stefik et al. | 395/239 |
| 5,640,297 | 6/1997 | Labaze | 361/683 |
| 5,677,905 | 10/1997 | Bigham et al. | 370/94.2 |
| 5,808,660 | 9/1998 | Sekine et al. | 455/6.3 |

OTHER PUBLICATIONS

Micropolis, AV Servers, Application Guide.

B/E Aerospace, Multimedia Digital Distribution System (MDDS) Product Advertisement.

Optibase, "Optibase & BEA Make MPEG Fly," Digital Video News, p. 1, Jul. 1995.

"BE Aerospace interactive video system successfully debuts on British Airways B747; Company awarded $33 million in new seating programs," Business Wire, Nov. 21, 1995.

Interactive Flight Technologies, Inc. product advertisement, "The Height of Entertainment".

"Video–On–Demand Trial Starts on Alitalia Airlines . . . ," European Media Business & Finance, Nov. 3, 1995, Phillips Publishing, Inc.

"First totally digitalized in–flight entertainment system to be introduced on international carrier—Alitalia; IFT system will debut on Rome to Chicago flight Dec. 1st," Business Wire, Nov. 30, 1995.

A. Morris, "Flying Those Interactive Skies," TV Technology, p. 10, Oct. 1995.

"Interactive Flight Technologies signs agreement with Swissair; IFT to install In–Flight Entertainment System, complete with Casino–Style Gambling, On All 21 of its long–haul jets," Business Wire, May 2, 1996.

"TNCi continues Airview(TM) enhancement with telephone interface," PR Newswire, Nov. 28, 1995.

"The network connection announces Hiper Cheetah—300 simultaneous video streams," PR Newswire, Jun. 7, 1996.

MAS System 2000E Product Literature, Matsushita Avionics Systems Corporation.

KrisWorld product information sheet, "The KrisWorld System".

Celestel product information sheet, "Telephone and Facsimile".

"A 'mortal lock' for airlines," 1995 IAC.

"Direct Broadcast Satellite TV for Airborne Applications," Hughes–Avicom International, Inc., 1996.

"Hughes–Avicom takes television airborne—featuring live satellite broadcast on board Delta Air Lines' Spirit of Delta B767 aircraft," Hughes–Avicom International product brochure, 1996.

"Hughes–Avicom International launches first live direct broadcast satellite TV on Delta Air Lines B767," press release, Hughes–Avicom International Inc., Aug. 12, 1996.

"Get the show in the air . . . DBS–2000™ In–Flight Satellite Television System," Datron/Transco Inc. product brochure, Sep. 5, 1996.

"Concurrent Computer Corporation's PowerMaxion Selected by Mitsubishi Electric Corporation for First Demonstration of Mitsubishi Electric's Digital In–Flight Entertainment System," press release, Concurrent Computer Corporation, Sep. 17, 1996.

"Maxion high–performance digital video servers," Concurrent Computer Corporation, Sep. 11, 1996.

"Setting a new standard—the next generation in personal passenger entertainment," product brochure, Sony Trans Com, Inc., 1996.

"Sony Trans Com: celebrating 25 Years in IFE," promotional literature, Sony Trans Com, Inc., Sep. 1996.

"Sony's Interactive IFES to Fly in '98," press release, Sony Trans Com, Inc., Sep. 1996.

"Making digital entertainment fly," product brochure, Mitsubishi Electric, Sep. 1996.

"AirView," product brochure, The Network Connection, Inc.

"Pascall Power Products," product brochure, Pascall Electronics Ltd.

"The Sony's New Interactive Passenger Entertainment System," system description, Sony Trans Com, Inc., Sep. 1996.

"MDDS The Advanced Interactive Video System that won't leave your customers or crew holding the bag!," B/E product advertisement appearing in AVION, Fourth Quarter, 1996.

"MAS System 2000 E/VOD," Matsushita Avionics System product advertisement appearing in AVION, Fourth Quarter, 1996.

"Discover The Power," Sony product advertisement appearing in AVION, Fourth Quarter, 1996.

Interactive Flight Technologies, Inc., promotional advertisement appearing in AVION, Fourth Quarter, 1996.

COMBINED DIGITAL AUDIO/VIDEO ON DEMAND AND BROADCAST DISTRIBUTION SYSTEM

FIELD OF THE INVENTION

The present invention relates to the field of audio and video on demand entertainment systems. More particularly, the present invention relates to the field of distributed network video on demand entertainment and broadcast distribution systems for use onboard an aircraft during flight.

BACKGROUND OF THE INVENTION

In-flight entertainment on an airplane has traditionally consisted of the ability to watch a single video on an overhead screen and listen to one of multiple audio channels through a headset. The overhead screens are distributed throughout the airplane's cabin and are sometimes difficult to view from some seats within the cabin. The video is chosen by the airline and played simultaneously for viewing by all passengers. In most instances, a passenger desiring to hear the audio accompanying a featured film must rent or purchase a headset to be plugged into their seat console. A passenger who leaves their seat to stretch, go to the restroom or make a telephone call will end up missing a portion of the movie. Typically, the same feature film is played for a predetermined period of time on an airline, such as a calendar month, with different feature films played during travel in different directions within specific regions. For example, a first film will typically be played during travel within the United States in a western direction and a second film will be played during the same time period during travel within the United States in an eastern direction. Accordingly, for travellers travelling frequently during the same time period, it is highly likely that they will be on multiple flights featuring the same feature film. The airline is therefore losing potential revenue because it is likely that the passenger will not purchase a headset to view a movie that they have already watched.

Video on demand in-flight entertainment systems are being developed by multiple companies to provide numerous entertainment options to each passenger, thereby reducing the likelihood that a passenger has already viewed every option on the system. Video on demand entertainment systems typically include a control system and distributed individual video and audio systems of some form at each seat. Thus, each passenger with access to an individual video on demand entertainment unit has the ability to choose from among multiple movies, audio channels, video games, including gambling and other entertainment options. Previous video on demand systems have offered featured films at selected start increments during the airplane's flight, such as every ten minutes. With such systems, a passenger who leaves their seat to stretch, go to the restroom or make a telephone call, will still miss a portion of the movie. Each passenger however, is able to choose from among multiple feature films, reducing the likelihood that they have viewed all of the available movie options.

Some or all of these video on demand entertainment options are provided at an additional cost to the passenger. This cost can be collected through a credit card reader, integrated into the video on demand system, at each passenger's seat. The passenger can swipe their credit card through the credit card reader and can then choose the video on demand features which they desire to view or play. The cost of the chosen feature will then be automatically charged to the passenger's credit card. In this manner, gambling services can also be provided to passengers through the video on demand entertainment system, allowing a passenger to wager up to a specified limit, secured by authorization to charge their credit card. When the passenger is finished using the gambling services, the amount that the passenger has won or lost is credited or charged to their credit card.

One such video on demand in-flight entertainment system has been developed by Interactive Flight Technologies of Las Vegas, Nev. This system is advertised to allow a passenger to choose from among thirty feature films, gambling, on-board shopping, video games and an Airshow feature. Airshow is a moving map display feature, provided by Airshow of Tustin, Calif., which allows the passenger to view the route of the current flight and the airplane's current position along that route. This video on demand system is controlled by cluster computers which serve groups of seats. Each seat is equipped with a 486 compatible computer with an integral hard drive and RAM, through which the user accesses the video on demand system.

Another video on demand in-flight entertainment system has been developed by B/E Aerospace of Irvine, Calif. This system is advertised to provide a passenger with over 500 channels for regular video programming such as movies, as well as live broadcast television and a variety of interactive features such as video games. This system also provides duty free and catalog shopping, information menus, and both ground-base and satellite in-cabin telephone distribution through an individual video on demand module at the passenger's seat. The control electronics for this system are installed in a former galley unit on the aircraft which has been retrofitted to house the video on demand system. The control electronics are then coupled to each individual video on demand module throughout the cabin by a star network, with separate data wires running between each individual module and the control electronics.

A safety video or demonstration is required to be performed for the passengers on an aircraft before the aircraft takes off. This safety demonstration is required by U.S. Federal law and provides instructions to the passengers regarding procedures to be followed in the event of an emergency. On smaller aircraft equipped for shorter flights, the text of this safety demonstration is read over the airplane's intercom system by one of the airline's staff, while other members of the staff demonstrate necessary functions of the airplane's safety and exit equipment for the passengers. On bigger airplanes equipped with video screens or monitors, a safety video is played for simultaneous viewing by all of the passengers. This safety video is prerecorded and includes the same required text and illustrations as the live safety demonstration. Sometimes, the flight attendants, in conjunction with the safety video, will also perform live equipment demonstrations during the playing of the video. Accordingly, it is important that all passengers are viewing the safety video simultaneously.

What is needed is a video on demand in-flight entertainment system which is fully interactive and can provide multiple features to a passenger through an individual module. What is further needed is a video on demand in-flight entertainment system which uses complete end-to-end digital delivery from the control system to the passenger seat units and also includes an overhead broadcast system. What is still further needed is a video on demand in-flight entertainment system which provides all entertainment features on demand to all passengers having access to a passenger seat unit at all authorized times. Additionally, what is needed is an in-flight entertainment system which incorporates a serial network and is therefore lighter, easier to maintain and easier to reconfigure than existing systems. What is also needed is an in-flight entertainment system which includes separate and redundant systems allowing a portion of the system to fail without rendering the entire system nonoperational.

SUMMARY OF THE INVENTION

An in-flight passenger entertainment system has a first digital network for communication among components of a headend system including a data server, media controller, one or more media servers, system interface unit, system manager unit and attendant control panel. The in-flight entertainment system is coupled to an aircraft's existing systems through the system interface unit and the system manager unit. The components of the headend system are all coupled to a network switch for routing data within the first network. The network switch is also coupled to one or more zone bridge units, each of which is coupled to multiple seat electronics units. The zone bridge units and the seat electronics units together form a second digital network. The first digital network is preferably an ATM network with fibre optic cables used to carry the data. The second digital network is preferably an IEEE 1394 serial bus network. The zone bridge units control all communications between the networks, converting all communications into the format required by the respective network. All communications across the networks are transmitted as digital data and when necessary are converted to analog signals at the seat electronics units. Through passenger control sets coupled to the seat electronics units, a passenger has access to audio and video on demand, video games, gambling, telephone service and information services. A passenger also has the ability to fast forward, rewind and pause a video feature. An overhead audio and video distribution system is used to provide audio and video content as a backup to the video on demand system or as an alternative subsystem in zones of the aircraft in which there are passenger control sets with less than full capability. A first audio path for transmitting audio content from the headend system is routed to predetermined seat entertainment units through the network switch and the zone bridge units. A second audio path for transmitting audio from the system interface unit is routed to the seat entertainment units through the zone bridge units.

DETAILED DESCRIPTION OF THE PREFERRED EMBODIMENT

Figure 1:
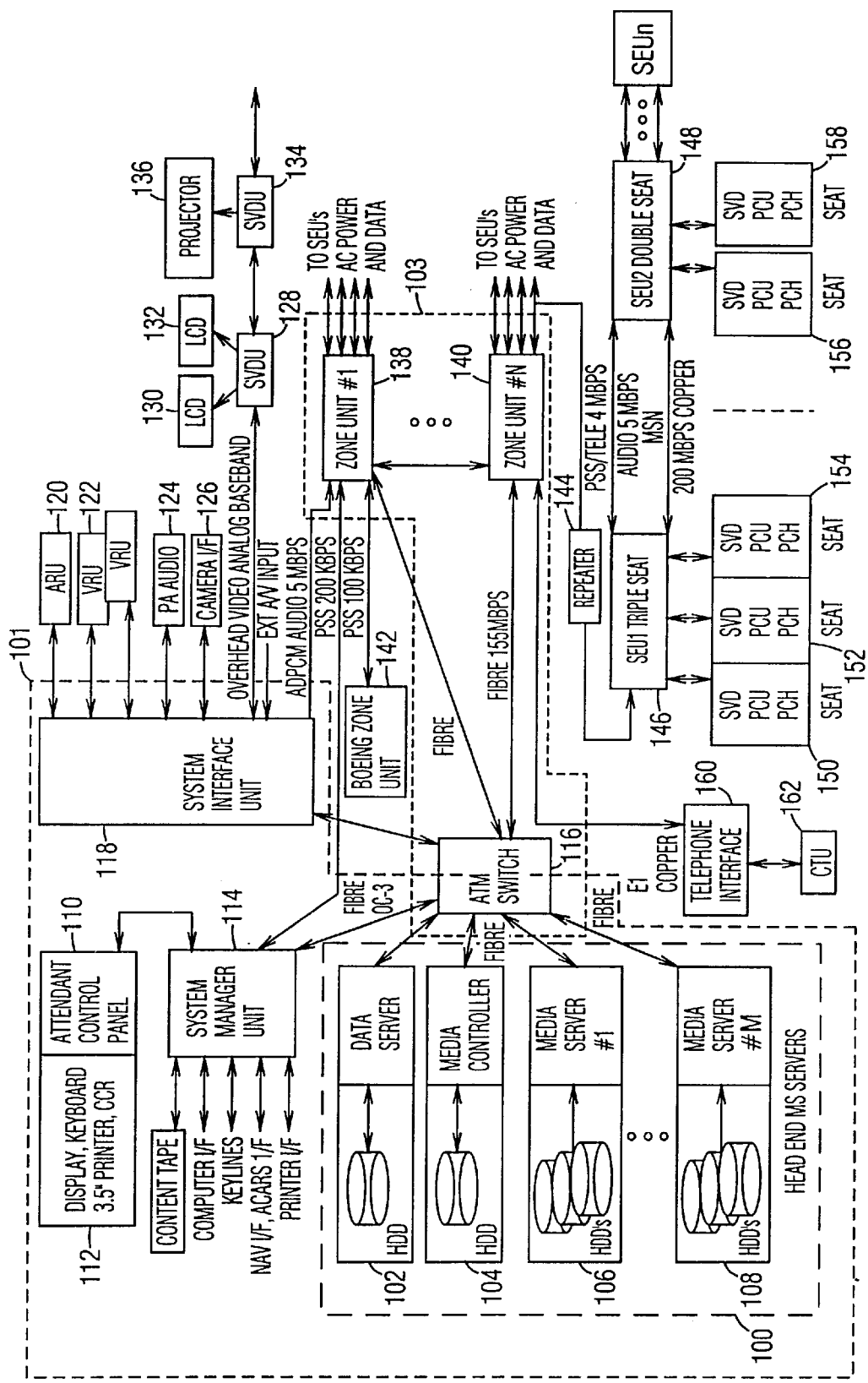
FIG. 1 illustrates a system block diagram of a digital video on demand and backup broadcast distribution system of the present invention.

An in-flight entertainment system includes a headend system having a data server, a media controller, one or more media servers, a system interface unit, a system manager unit and an attendant control panel. The components of the headend system are coupled together for communications by a digital ATM network. Preferably, fibre optic cables are used to form the ATM network. The components of the headend system are all coupled, through the ATM network, to an ATM network switch, for routing data within the network. The network switch is also coupled to one or more zone bridge units. Each of the zone bridge units is coupled to multiple seat electronics units. Each seat electronics unit is coupled to control one or more passenger control sets through which passengers on the aircraft access the in-flight entertainment system of the present invention. The zone bridge units and the multiple seat electronics units are coupled together by an IEEE 1394 serial bus network. All communications across both of the networks are transmitted as digital data and when necessary, are converted to analog signals at the seat electronics units.

The in-flight entertainment system is coupled to the aircraft's existing systems through the system interface unit and the system manager unit. An overhead audio and video distribution system, controlled by the system interface unit, is used to provide audio and video content as a backup to the ATM/1394 network and as an alternate subsystem in zones of the aircraft in which there are passenger control sets with less than full capability. Audio and video content data for use at the seat electronics units is stored and delivered from the media servers. When requested by a passenger, this audio and video content data is transmitted from the media servers, over the ATM network to the appropriate zone bridge unit. This transmission is controlled by the media controller at the headend of the system. From the zone bridge unit, the data is then transmitted over the IEEE 1394 serial bus to the appropriate seat electronics unit. Through each passenger control set of seat peripherals, a passenger has access to audio and video on demand, video games, gambling, telephone service and information services, such as the airline's flight schedule. When utilizing the video on demand features, a passenger also has the ability to fast forward, rewind and pause a video feature.

Within the in-flight entertainment system of the present invention, data is collected, stored and arranged in data sets, in a conventional manner. It should be understood that, as used herein, data sets can include audio data, video data or both audio and video data, game information, purchasing information, gambling information, software and control data. It should also be understood that, as used herein, data sets can also include any other appropriate collection of data.

Dual audio distribution paths are maintained from the headend system to the seat electronics units. A first audio distribution path is routed from the headend servers through the ATM network switch to the zone bridge units. From the zone bridge units, the first audio path is then distributed to the seat electronics units. The first audio distribution path is used for the distribution of audio content from the media servers. A second audio distribution path is routed from the system interface unit to the zone bridge units and then to the seat electronics units. The second audio distribution path is used for the distribution of audio for public address announcements and for overhead entertainment audio. The second audio distribution path is provided to all of the seat electronics units. The first audio distribution path is provided to seat electronics units within selected zones where the audio and video on demand features of the in-flight entertainment system are available. As will be described below, an alternate embodiment of the present invention also allows a subsystem to be implemented with only the second audio distribution path. This subsystem can then be upgraded to include the first audio distribution path in those zones of the aircraft including video on demand features.

A system block diagram of an in-flight entertainment system including a digital video on demand and backup broadcast distribution system of the present invention is illustrated in FIG. 1. Headend servers 100 of the system include a data server 102, a media controller 104 and multiple media servers 106 and 108. The data server 102 includes a hard disk drive which stores and transmits data necessary for playing video games at a passenger's seat electronics unit and also maintains the data and statistics related to the amount of money and time spent on different features at each individual passenger seat.

The media controller 104 preferably includes a hard disk drive and is responsible for the scheduling of continuous media streams from the headend servers 100 to the seat electronic units, loading of content to the media servers 106 and 108 and control of trick mode operation at each individual seat electronic unit. The trick mode operation includes the rescheduling of a data stream when a passenger sends fast forward, rewind, pause or stop instructions while viewing a video feature.

Each of the media servers includes one or more hard disk drives and stores data to support the video on demand and audio on demand features of the system, including data representing feature films and audio content. The number of media servers necessary is dependent upon both the content storage requirements and the number of simultaneous streams of data supported by the system. Constant bit rate, isochronous intervals are used to distribute data from the media servers 106 and 108 through the seat electronics units to the passenger sets of seat peripherals. The data server 102, the media controller 104 and the media servers 106 and 108 are all coupled to an asynchronous transfer mode (ATM) network switch 116, preferably by fibre optic cables.

A system manager unit 114 is also coupled to the ATM switch 116, preferably by a fibre optic cable. The system manager unit 114 is coupled to an attendant control panel 110 for receiving data from and providing data to a system attendant. The attendant control panel 110 is coupled to a set of input/output devices 112, including a display, a keyboard, a printer and a credit card reader. For purposes of this document, the term credit card reader will be understood to include smart card reader where appropriate. The system manager unit 114 provides the interface to the attendant control panel 110. The system manager unit 114 also includes a computer, for entering data into and reading data from the video on demand system, which is accessed through conventional electronic media readers such as a floppy disk drive, CD Rom drive or a magnetic tape drive. Content data for the video on demand system is loaded through the system manager unit 114 and decrypted before being stored on the appropriate one of either the data server 102, the media controller 104 and the media servers 106 and 108.

Data is provided to and extracted from the system through this computer. The system manager unit 114 also provides an interface to the aircraft's navigational system (NAV) and to an airline communication addressing response system (ACARS), which allows air to ground communication between the aircraft and the airline. The system manager unit 114 further provides an interface to a printer for extracting data reports and receipts from the system in printed form. The system manager unit 114 is also coupled to receive, generate and monitor keyline control signals for monitoring conditions of the airplane such as decompression and weight on the wheels. The system manager unit 114 is also coupled to a first zone bridge unit 138 for monitoring and controlling communications relating to the passenger service system (PSS).

A system interface unit 118 is also coupled to the ATM switch 116, preferably by a fibre optic cable. The system interface unit 118 is coupled to the aircraft's conventional entertainment system and drives the overhead display system including overhead video monitors and audio system, as will be described below. This overhead audio system a public address (PA) audio system. The system interface unit 118 and the overhead video monitors and audio system together provide an alternate and backup broadcast system which allows the airline flexibility in the design of the interior of the airplane's cabin and a backup system in the event of a failure of the video on demand entertainment system. The system interface unit 118 is coupled to an audio reproducer unit 120, which preferably includes a compact disk player with multiple compact disks containing audio data. The system interface unit 118 is also coupled to one or more video reproducer units 122, which each preferably include a video cassette player and the ability to output video content from inserted video cassettes. The video reproducer units 122 could also include one or more video disk players.

The system interface unit 118 is also coupled to the aircraft's public address audio system 124, over which the pilot, crew and flight attendants of the airplane can address the passengers. The system interface unit 118 implements an override condition which overrides any other audio content being presented to the passengers when the pilot or crew is using the PA audio system. The system interface unit 118 further provides a camera interface 126 to a camera which is mounted to the outside of the airplane and used for observation of certain aspects of the airplane's flight, such as takeoff and landing. Multiple smart video distribution units (SVDU) 128 and 134 are coupled to the system interface unit 118 in a daisy-chain configuration for controlling overhead video monitors 130 and 132, which may be LCDs as shown or any other substantially flat, light-weight display, or a projection system 136, depending on the configuration of the airplane. The system interface unit 118 is also coupled to receive an external audio/video input. The system interface unit 118 is further coupled to the first zone box unit 138.

The smart video display units 128 and 134 distribute video from the system interface unit 118 at the headend to the overhead displays 130 and 132 or a display system 136. The smart video display units 128 and 134 also provide power and display controls to the display system 136 and the overhead displays 130 and 132. The display system can be either a projection system or monitor depending on the configuration of the aircraft.

The data server 102, media controller 104, media servers 106 and 108, system management unit 114, attendant control panel 110 and system interface unit 118 are all components of the headend control system 101. Together, these components provide centralized storage of content, control of content delivery, system code storage, data storage, aircraft system interfaces, attendant station functions, network administration, maintenance management, billing services, live audio/video distribution and overhead audio/video generation and control.

Each of the zone bridge units 138 and 140 are coupled to the ATM switch 116, preferably by fibre optic cables. In addition, the zone bridge units 138 and 140 are coupled to one another, preferably by IEEE 1394 standard digital cables. Likewise, the zone bridge units 138 and 140 are coupled to a predetermined set of seat electronics units, preferably via an IEEE 1394 serial bus network. An IEEE 1394 serial bus network is therefore formed between the zone bridge units 138 and 140 and their respective seat electronics units for communicating with the system manager unit 114 and receiving data from the headend servers 100 through the ATM switch 116. Each zone bridge unit is coupled to the ATM switch 116 and to control multiple seat electronics units, including providing power and data to and from the seat electronics units. In the system of the preferred embodiment, each zone bridge unit is configured to control up to 50 seat electronics units. For illustration purposes, only a portion of the configuration of the zone bridge unit 140, relative to specific seat electronics units within its zone, is illustrated in FIG. 1. It should be readily understood, that the remaining zone bridge units within the system and the remaining seat electronic unit ports of the zone bridge unit 140 will include similar configurations.

The zone bridge unit 140 is coupled to a repeater 144. The repeater 144 is coupled to a triple seat electronics unit 146. The triple seat electronics unit 146 is coupled to control and provide data to three sets of seat peripherals 150, 152 and 154. The triple seat electronics unit 146 is further coupled to a double seat electronics unit 148. The double seat electronics unit 148 is coupled to control and provide data to two sets of seat peripherals 156 and 158. The double seat electronics unit 148 is coupled to one or more additional seat electronics units 149, depending on the exact configuration of the aircraft. This exact configuration is representative only. Combinations of triple seat electronics units 146 and double seat electronics units 148 are used to cover numerous configurations of seats within the airplane's cabin, to allow an airline maximum flexibility to configure each individual aircraft.

Each set of seat peripherals 150, 152, 154, 156 and 158 include a seat video display, a passenger control unit and a passenger control handset and together with the controlling seat electronics unit effectively implement a personal computer, including internal memory, which receives content data based on the passenger's request, over the IEEE 1394 serial bus network. As will be described in detail below, communications between the seat electronics units, within this zone, and other components within the system are all transmitted using digital data through the ATM network switch 116 and the zone bridge unit 140. The seat electronics units then convert the digital data to analog data as necessary.

The zone bridge unit 140 is also coupled to a telephone interface circuit 160. Each telephone interface circuit 160 is coupled to a communications telephone unit 162, through which a passenger is connected to the aircraft's telephone system and is able to make an air to ground telephone call. Each of the passenger control handsets include a telephone handset. In the preferred embodiment, ten simultaneous telephone calls are permitted within a zone having 50 seat entertainment units.

The ATM switch unit 116 and the zone bridge units 138 and 140 together form a network distribution system 103. The network distribution system provides for and controls the delivery of data, such as stored content, code, application data, live content and control data, from the servers of the headend control system to the seat electronics units. The network distribution system also provides for and controls the delivery of data, such as, but not limited to, switch data, billing data and game data, from the seat electronics units to the servers of the headend control system. Between each of the components of the headend control system and the ATM switch 116, data is preferably transmitted in a digital format through fibre optic cables. Between each of the zone bridge units 138 and 140 and their respective seat electronics units 146 and 148, data is transmitted in a digital format through IEEE 1394 standard cables. Accordingly, an ATM network is formed between the components of the headend control system, the ATM switch 116 and the zone bridge units 138 and 140, while an IEEE 1394 serial bus network is formed between each zone bridge unit 138 and 140 and the seat electronics units to which it is coupled.

Data transmitted from the headend control system to the seats is sent over the ATM network, through the ATM switch 116 to the proper zone bridge unit 138 and 140, where it is adapted to the IEEE 1394 format and delivered to the proper seat electronics unit over the IEEE 1394 serial bus. Data sent from the seat electronics units to one of the headend servers or to the system manager unit travels over the IEEE 1394 serial bus to the appropriate zone bridge unit where it is adapted to the ATM network, sent to the ATM switch 116 and routed to the proper headend server. The IEEE standard, "P1394 Standard For A High Performance Serial Bus," Draft 8.01v1, Jun. 16, 1995, is an international standard for implementing an inexpensive high-speed serial bus architecture which supports both asynchronous and isochronous format data transfers.

The passenger set of seat peripherals each provide passenger video display and audio listening capability. Each passenger is provided a control interface that includes a passenger control unit and preferably a handset. The passenger control handset preferably includes a telephone handset, a game controller, a content selection device and a credit card reader. The game controller provides an enhanced game interface. The credit card reader allows entry of billing information and provides security of payment for services and entertainment enjoyed by the passenger. While preferably the audio listening capability is provided through a conventional audio headset, alternatively, this capability can also be provided through a noise cancelling headset. Also, while preferably an LCD display is included within a passenger set of seat peripherals, other types of relatively light weight and relatively high brightness and definition displays are acceptable for use with the present invention, including, for example, goggle-type LCD displays such GLASTRON™ sold by Sony Corporation, Tokyo Japan.

The in-flight entertainment system of the present invention is designed to allow adaptability and flexibility in the configuration and design of the aircraft's cabin. The inclusion of the system interface unit 118, which interfaces to the overhead portion of the entertainment system allows the overhead system to be used in conjunction with or as a backup to the on-demand portion of the entertainment system of the present invention. This flexibility allows for the use of the video on demand entertainment system in one or more classes or zones of seats within the cabin and the use of the conventional overhead entertainment system in the remaining classes or zones of seats. Also, in the event of failure of the on-demand portion of the entertainment system, the overhead entertainment system is used as a backup to provide entertainment and other content features to the passengers.

Figure 15A:
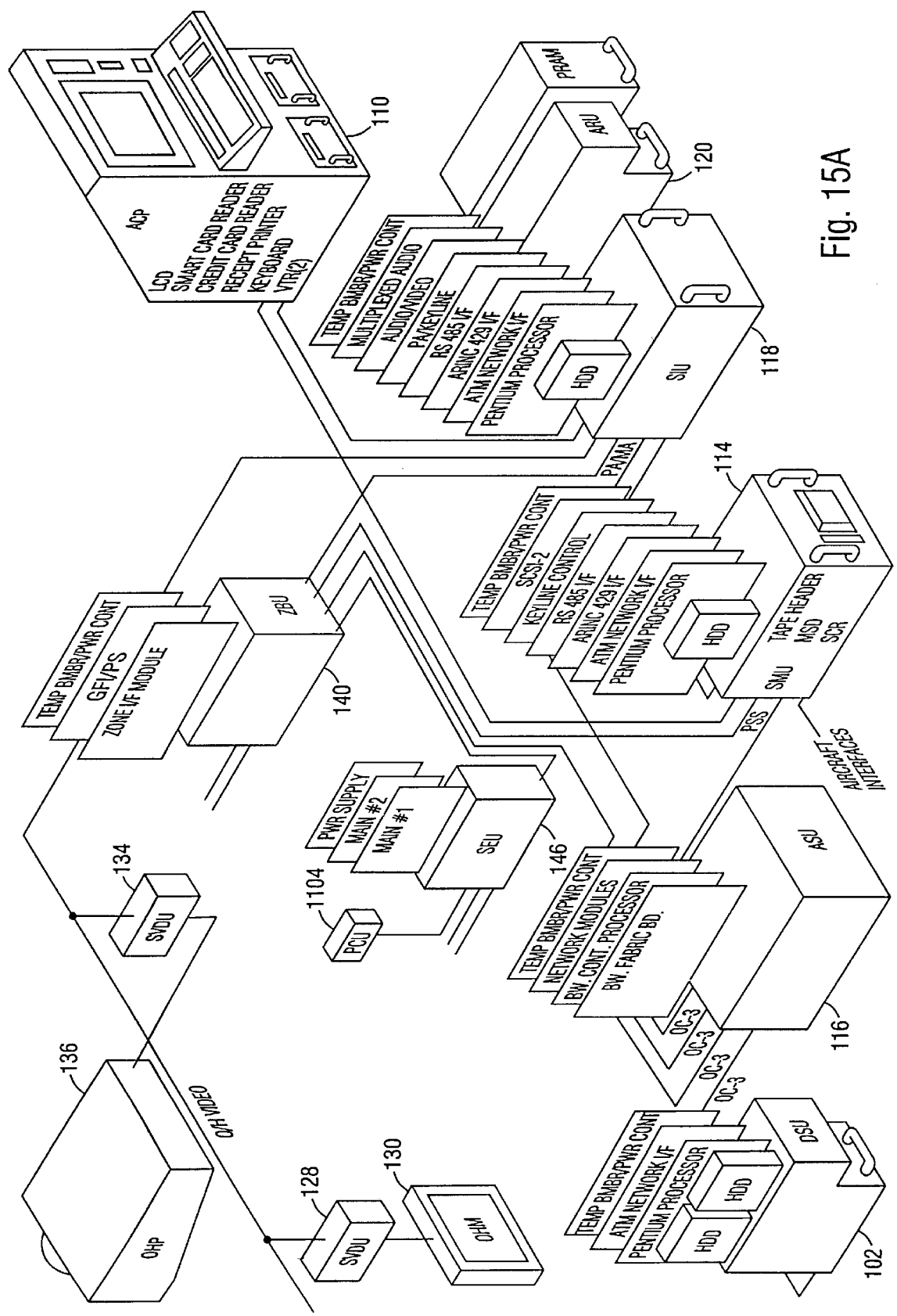
FIG. 15A illustrates a block diagram of a subsystem of the present invention without video on demand capabilities.

In an alternate embodiment, illustrated in the block diagram of FIG. 15A, only an overhead subsystem is implemented. This subsystem includes only the components necessary to provide entertainment through the overhead portion of the system. These components include the data server unit 102, the system manager unit 114, the system interface unit 118, the audio reproducer unit 120 and the attendant control panel 110, within the headend system 101. The subsystems also include the ATM switch 116, the zone bridge units 140, the seat electronics units 146 and the smart video display units 128 and 134 with either overhead monitors 130 and/or overhead projectors 136. In the implementation of this subsystem, each passenger set of seat peripherals includes only a passenger control unit 1104.

Figure 15B:
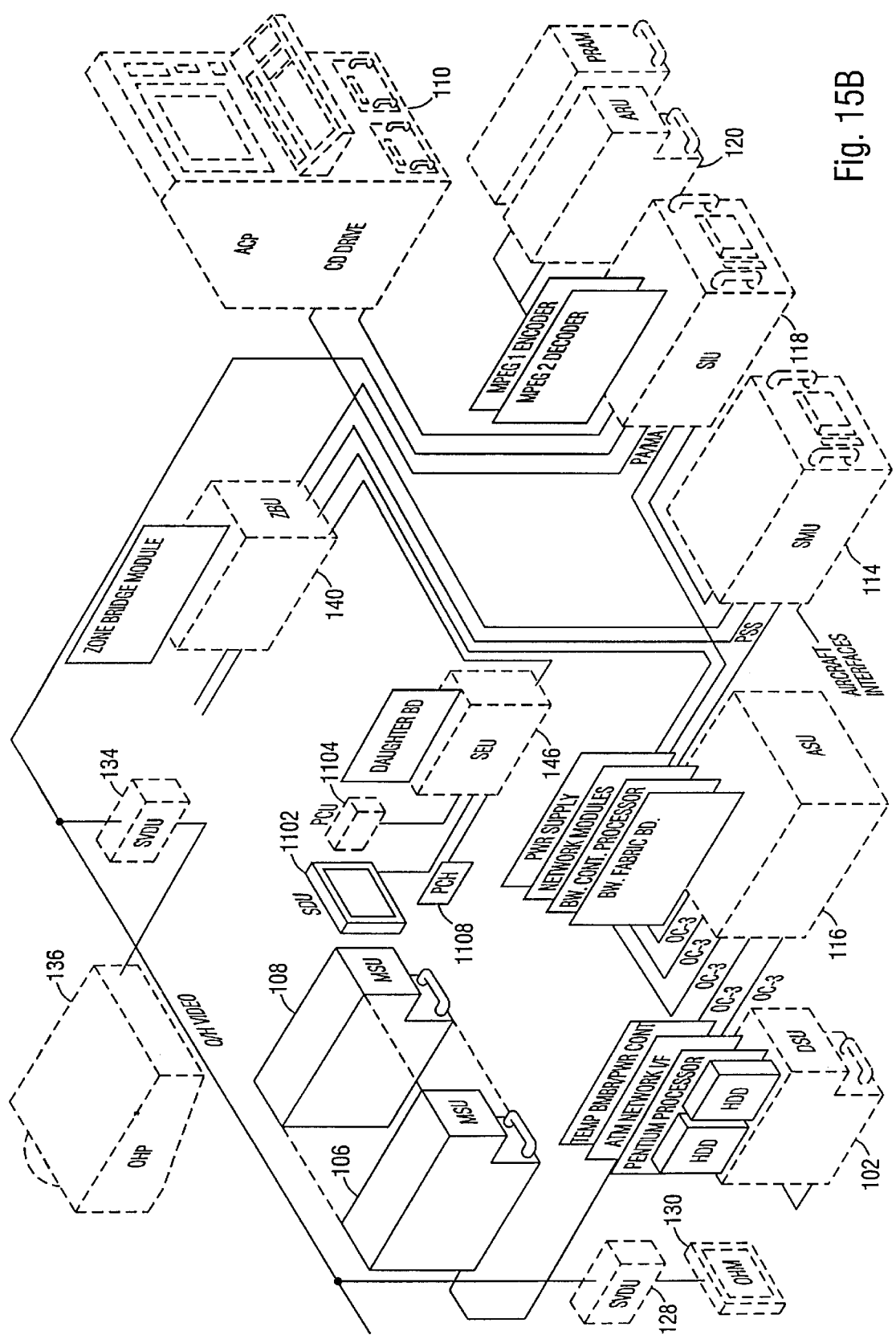
FIG. 15B illustrates the additions to the subsystem of FIG. 15A which are required to provide video on demand within the system of the present invention.

The modifications necessary to upgrade the subsystem of FIG. 15A to a full video on demand system, according to the present invention, are illustrated in FIG. 15B. These modifications are shown outlined in solid lines, while the components already included within the subsystem are shown in dotted lines. Within the headend system 101, these modifications include the addition of one or more media server units 106 and 108, and the addition of control boards within the data server unit 102, and MPEG encoder and decoder boards within the system interface unit 118. Within the ATM switch unit 116, the addition of network module boards is also required. A zone bridge module must also be added to each zone bridge unit 138. Each passenger set of seat peripherals must be upgraded to include the display unit 1102 and the passenger control handset 1108. Each seat electronics unit must be upgraded to include a daughter board. With these modifications, a subsystem, as illustrated in FIG. 15A, can be upgraded to a full video on demand system, as illustrated in FIG. 15B.

Figure 2:
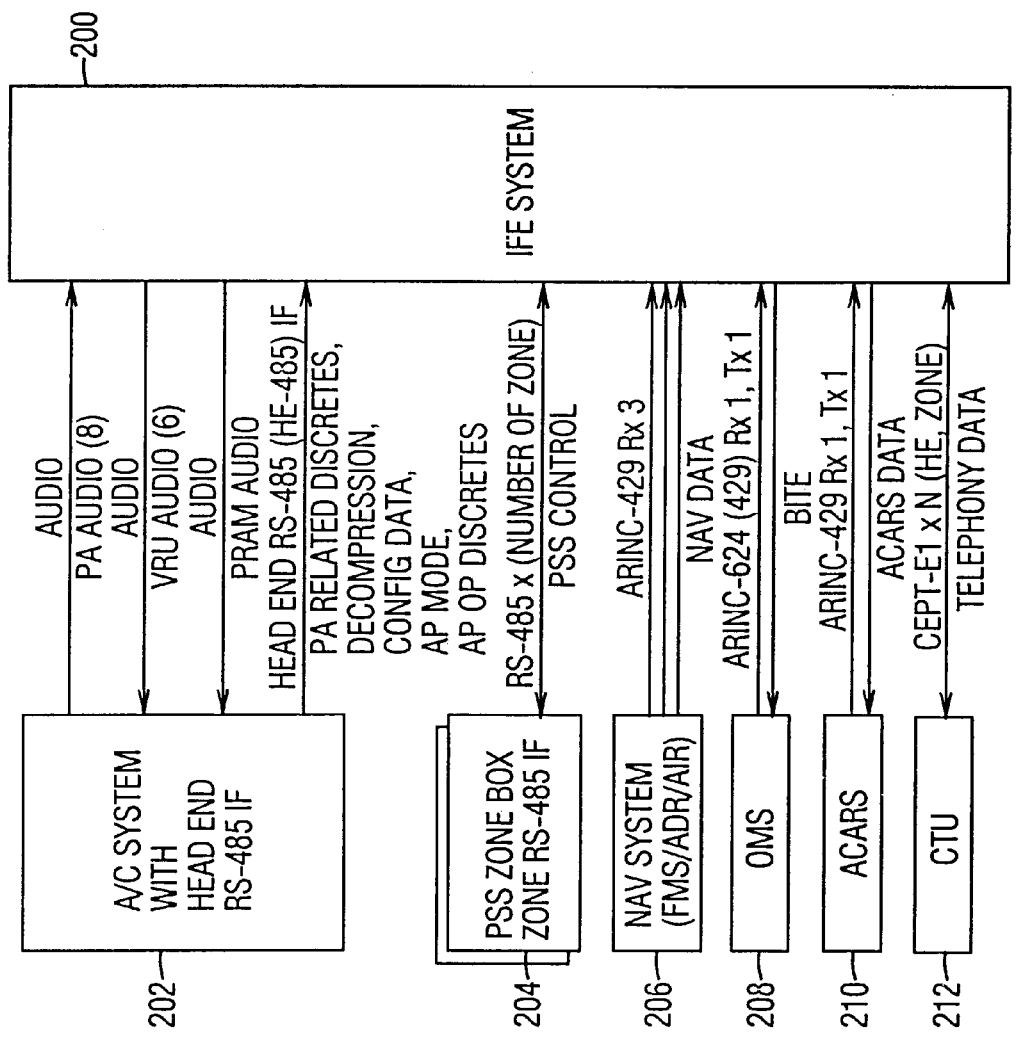
FIG. 2 illustrates the interface couplings between the in-flight entertainment system 200 of the present invention and the aircraft's existing systems.

The interface couplings between the in-flight entertainment system 200 of the present invention and other existing systems within the aircraft are illustrated in FIG. 2. The aircraft system and headend interface 202 is coupled to the in-flight entertainment system 200 by multiple audio signal lines, including the public address audio signal lines, the audio output from the video reproducer units and prerecorded announcement and boarding music (PRAM) audio. The aircraft system and headend interface 202 is also coupled to the in-flight entertainment system 200 by headend interface signals including public address related discrete control signals, decompression signals, configuration data signals, airplane mode signals and airplane operational discrete signals. A passenger service system (PSS) zone box 204 is coupled to the in-flight entertainment system 200 for communication of control signals related to the passenger service system. Signals from the aircraft's navigational system 206 are coupled to the in-flight entertainment system 200. The aircraft's operating maintenance system 208 is coupled to the in-flight entertainment system 200 for providing communications related to the maintenance of the aircraft. The airline communication addressing response system (ACARS) 210 is also coupled to the in-flight entertainment system 200 for providing air to ground communications between the airline and the aircraft. The aircraft's cabin telecommunications unit 212 is also coupled to the in-flight entertainment system 200 for linking the telephone handsets at the seat electronics units to the aircraft's telephone system, thereby allowing passengers to make air to ground telephone calls from the aircraft, through a link to a satellite or through radios to the ground.

Figure 3:
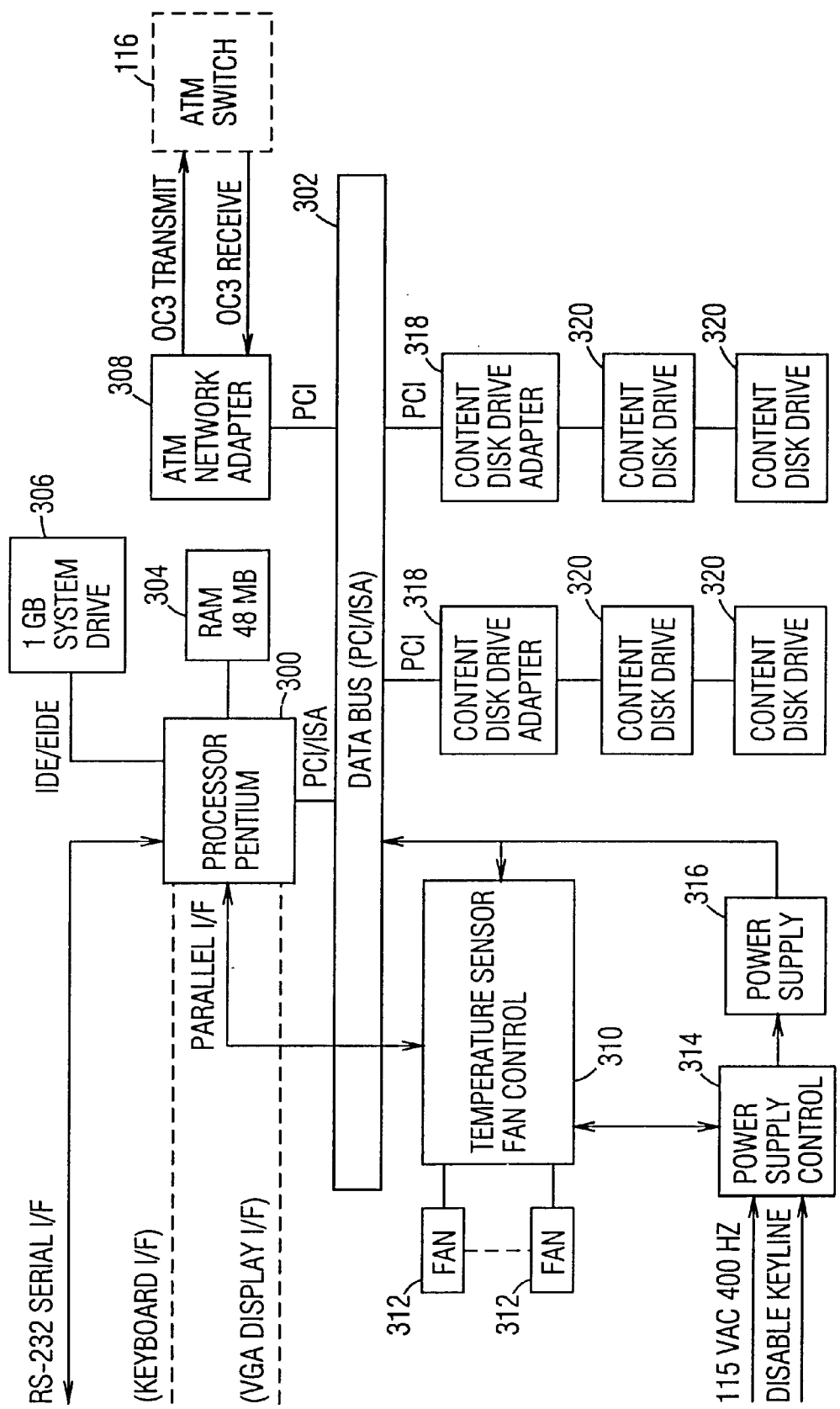
FIG. 3 illustrates a detailed block diagram of the components within the preferred embodiment of the media server units.

A detailed block diagram of the components within the media server units 106 and 108 is illustrated in FIG. 3. A preferred media server is the Microsoft Media Server, available from Microsoft of Redmond, Wash. A control processor 300 is coupled to a data bus 302 for controlling communications and providing instructions within the media server unit. The data bus 302 may be configured as a Peripheral Component Interconnect (PCI) bus, an Industry Standard Architecture (ISA) bus or any other appropriate type of data bus. The control processor 300 is also coupled to a system hard drive 306, an internal random access memory (RAM) 304 and a temperature sensor which includes a fan control circuit 310. The temperature sensor and fan control circuit 310 is coupled to one or more fans 312 for controlling the temperature within the media server unit. The data bus 302 is coupled to an ATM network adapter 308. The ATM network adapter 308 is coupled to the ATM switch 116 for communicating over the ATM network with other components within the system. Preferably, the ATM network adapter 308 is coupled to the ATM switch 116 by an OC3 fibre optic cable. Alternatively, any appropriate link can be used to couple the ATM network adapter 308 and the ATM switch 116. The data bus 302 is also coupled to one or more content disk drive adapters 318. Each content disk drive adapter 318 is coupled to one or more content disk drives 320 for storing data in and obtaining data from each of the content disk drives 320. The content disk drives 320 store audio and video content data to be accessed through the seat electronics units. A 115 volt, 400 Hertz, AC power line and a power disable keyline control signal are coupled to a power supply control circuit 314. The temperature sensor and fan control circuit 310 is also coupled to the power supply control circuit 314. The power supply control circuit 314 is coupled to a power supply circuit 316. The power supply circuit 316 is coupled to the temperature sensor and fan control circuit 310 and to the data bus 302 for providing power to the circuits within the media server unit.

Figure 4:
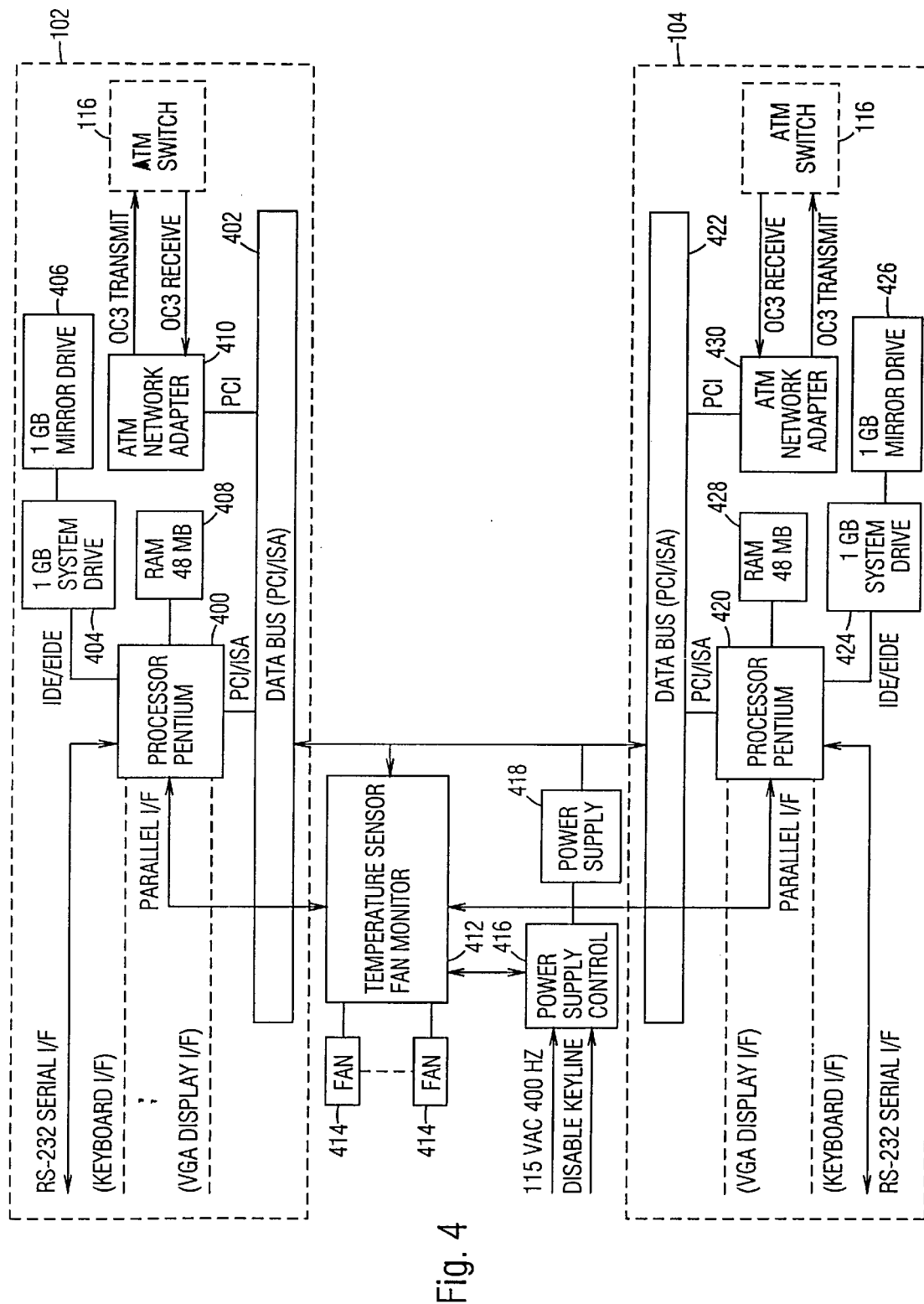
FIG. 4 illustrates a detailed block diagram of the components within the preferred embodiment of the media controller and the data server.

A detailed block diagram of the components within the media controller server 104 and the data server 102 are illustrated in FIG. 4. Within the preferred embodiment of the present invention, the media controller server 104 and the data server 102 are implemented within a single line replaceable unit. The data server unit 102 includes a control processor 400 which is coupled to a data bus 402 for controlling communications and providing instructions within the data server unit 102. The control processor 400 is also coupled to an internal RAM 408 and a system hard drive 404. The system hard drive 404 is coupled to a mirror hard drive 406 for providing redundancy and backup data.

The data bus 402 is also coupled to an ATM network adapter 410. The ATM network adapter 410 is coupled to the ATM switch 116 for communicating over the ATM network. Preferably, the ATM network adapter 410 is coupled to the ATM switch 116 by an OC3 fibre optic cable. Alternatively, any appropriate link can be used to couple the ATM network adapter 410 and the ATM switch 116.

A control processor 420 is coupled to a data bus 422 for controlling communications and providing instructions within the media controller unit 104. The control processor 420 is also coupled to an internal RAM 428 and a system hard drive 424. The system hard drive 424 is coupled to a mirror hard drive 426 for providing redundancy and backup data. In addition, the data bus 422 is coupled to an ATM network adapter 430. The ATM network adapter 430 is coupled to the ATM switch 116 for communicating over the ATM network with other components within the system. Preferably, the ATM network adapter 430 is coupled to the ATM switch 116 by an OC3 fibre optic cable. Alternatively, any appropriate link can be used to coupled the ATM network adapter 430 and the ATM switch 116.

A 115 volt, 400 Hertz, AC power line and a power disable keyline control signal are coupled to a power supply control circuit 416. The power supply control circuit 416 is coupled to a power supply circuit 418. The power supply circuit 418 is coupled to the data bus 402, to the data bus 422 and to a temperature sensor and fan monitor circuit 412 for providing power to the circuits within the line replaceable unit including the data server unit 102 and the media controller unit 104. The temperature sensor and fan monitor circuit 412 is coupled to the control processor 400, to the control processor 420 and to one or more fans 414 for controlling the temperature within the line replaceable unit. The temperature sensor and fan monitor circuit 412 is coupled to the power supply control circuit 416 to control the power if excessive temperature is detected.

Figure 5:
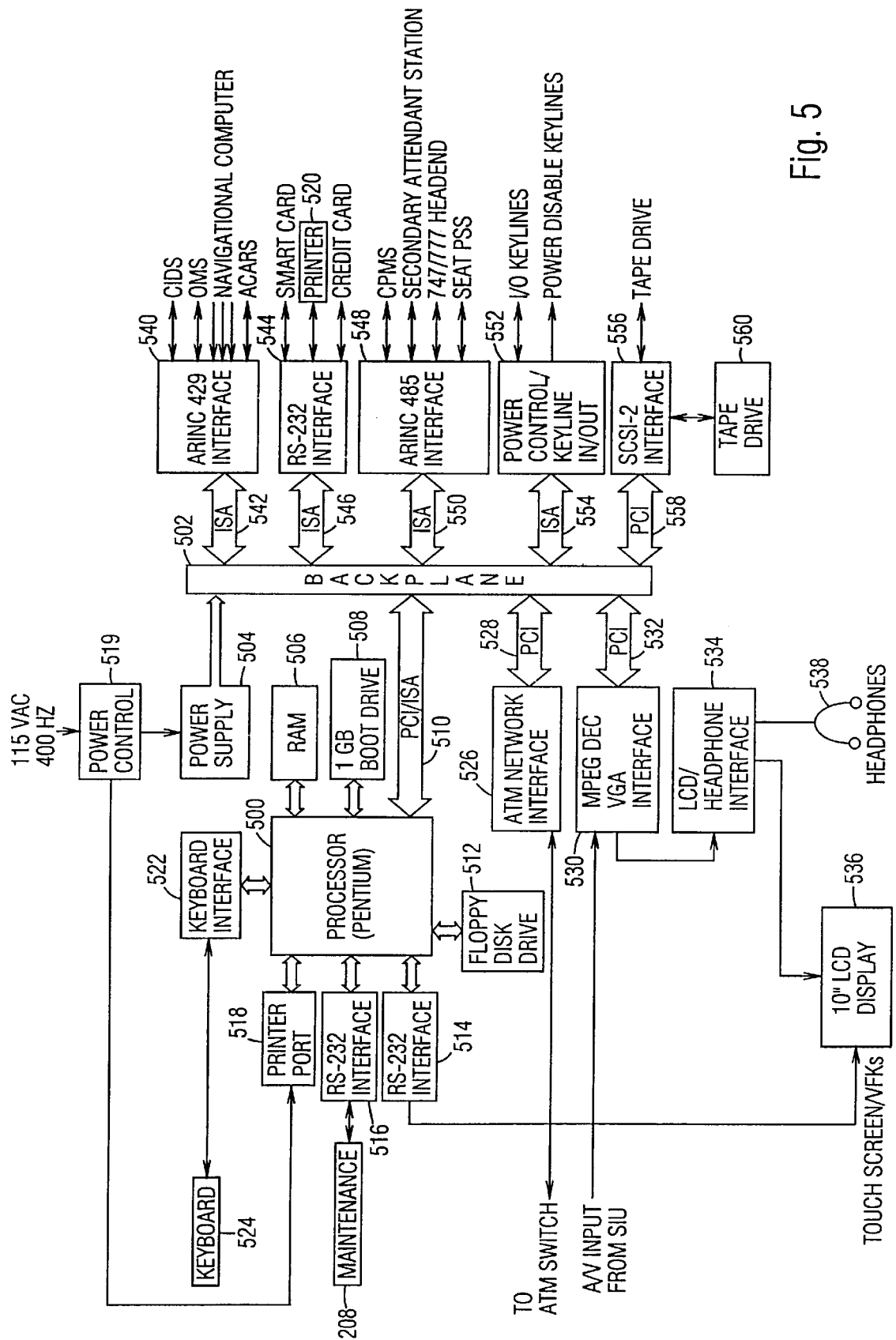
FIG. 5 illustrates a detailed block diagram of the components within the preferred embodiment of the system manager unit.

A detailed block diagram of the components within the system manager unit 114 is illustrated in FIG. 5. A control processor 500 is coupled to a backplane 502 through a data bus 510 for controlling communications and providing instructions to the components within the system manager unit 114. A power supply circuit 504 is also coupled to the backplane 502 for providing power to the components within the system manager unit 114. A power control circuit 519 is coupled to the power supply 504 and to the control processor 500, through the printer port 518. The control processor 500 is coupled to an internal RAM 506, a system hard drive 508 and a floppy disk drive 512. The control processor 500 is also coupled to a keyboard 524, through a keyboard interface circuit 522, to a maintenance port 208, through a RS-232 interface 516, and to a touch screen panel in a display 536, through a RS-232 interface 514. The backplane 502 is also coupled to an ATM network interface 526 by a PCI bus 528. The system manager unit 114 is coupled to the ATM switch 116 through the ATM network interface 526 for communications over the ATM network. The backplane 502 is also coupled to an MPEG video graphics adapter (VGA) interface 530 by a PCI bus 532. The MPEG VGA interface 530 is coupled to the system interface unit 118 for receiving audio and video input from the system interface unit. The MPEG VGA interface 530 is also coupled to the display 536 and to a set of audio headphones, through a display, headphone interface circuit 534 for communicating with an attendant.

The backplane 502 is further coupled to an Arinc 429 standard interface circuit 540, through an ISA bus 542, for communication with the systems within the aircraft, including the operational maintenance system, the navigational computer and the ACARS. The backplane 502 is also coupled to a RS-232 interface circuit 544, through an ISA bus 546, for communication with components of the attendant control panel 110, including a credit card and a receipt printer 520. The backplane 502 is also coupled to an Arinc 485 standard interface circuit 548, through an ISA bus 550, for communication with a cabin passenger management system (CPMS), a secondary attendant station, the aircraft's headend system and the passenger service system. The backplane 502 is also coupled to a power control keyline circuit 552, through an ISA bus 554, for providing power to disable keyline signals and coupling to other input/output keyline signals. The backplane 502 is further coupled to a SCSI-2 interface circuit 556, through a PCI bus 558, for coupling to and receiving data from a tape drive 560.

Figure 6:
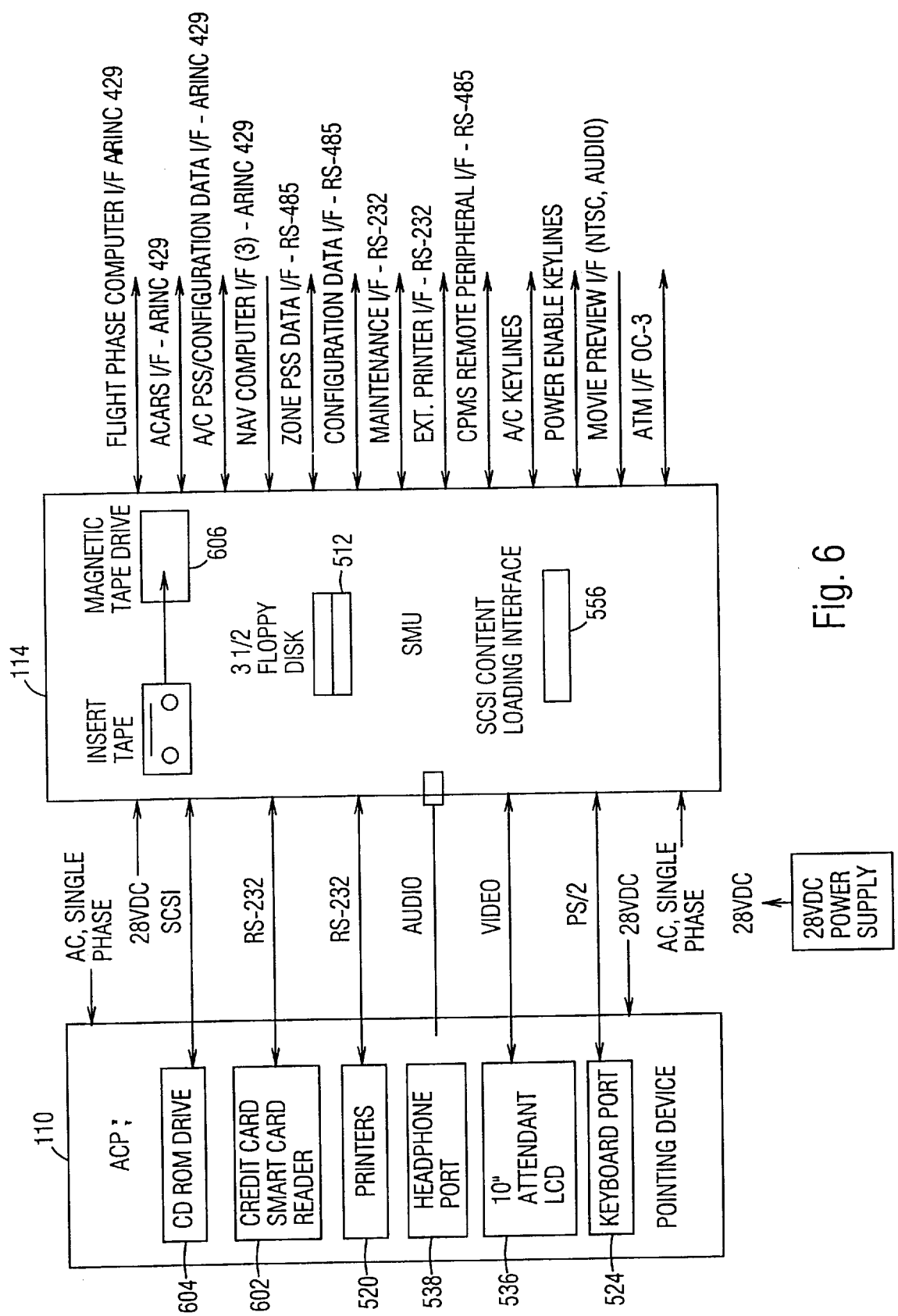
FIG. 6 illustrates a detailed block diagram of the preferred functional components and connections of the system manager unit and the attendant control panel.

A detailed block diagram of the functional components and couplings of the system manager unit 114 and the attendant control panel 110 is illustrated in FIG. 6. The system manager unit 114 includes multiple input/output devices, including a magnetic tape reader 606, a floppy disk drive 512 and a SCSI content loading interface 556 to which a tape drive or multiple tape drives can be connected to input content data to the in-flight entertainment system or to read data from the in-flight entertainment system. The attendant control panel 110 also includes multiple input/output devices, including a CD Rom drive 604, a credit card reader 602, one or more printers 520, a headphone port 538, a display 536 and a keyboard port 524. The keyboard which is coupled to the keyboard port 524 will preferably include an integral pointing device, such as a trackball, mouse or 'eraser head'. The credit card reader 602 allows attendants to read a passenger's credit card directly at the attendant station. Preferably, the credit card reader is part of the attendant control panel 110. A credit card receipt printer is used by an attendant to print a credit card receipt when a credit card is used by a passenger or entered by an attendant.

The display 536 is used by the attendant for menu navigation, through finction or task menus, on the attendant control panel 110 and for movie previews. Preferably, the display 536 is a ten inch, liquid crystal display, having a resolution of 640×480 and incorporating active matrix color display technology. Additionally, the preferred embodiment of the display 536 includes a touch screen interface and function keys.

Content data, such as updated feature films and audio content, is loaded from a tape unit, onto the media servers 106, through the SCSI content loading interface 556 or the magnetic tape drive 606. This loading of content data onto the media servers is preferably performed while the aircraft is at the terminal being serviced. In this manner, an airline can maintain a portable tape drive system which is brought out to each aircraft during routine servicing, in order to update the content available through the in-flight entertainment system of the present invention. Preferably, the tape unit interface supports a minimum read throughput of 1.5 megabytes per second and the tape unit is SCSI-2 fast compatible. Alternatively, the system will include multiple tape unit interfaces, providing for concurrent loading of content data from multiple tape units. It should also be noted that the system of the present invention preferably, only allows content data to be uploaded into the system. In order to protect proprietary content programming and prevent unauthorized copying by unscrupulous persons, content data cannot be downloaded from the preferred embodiment of the system of the present invention.

Control data, used to configure and control the in-flight entertainment system, is loaded into the system through floppy disks read by the floppy disk drive 512 or through CD Roms read by the CD Rom drive 604. Preferably, the floppy disk drive 512 and the CD Rom drive 604 support a minimum read throughput of 500 kilobytes per second. Alternatively, control data can be loaded using any other available means, including an electronic data link.

Figure 7:
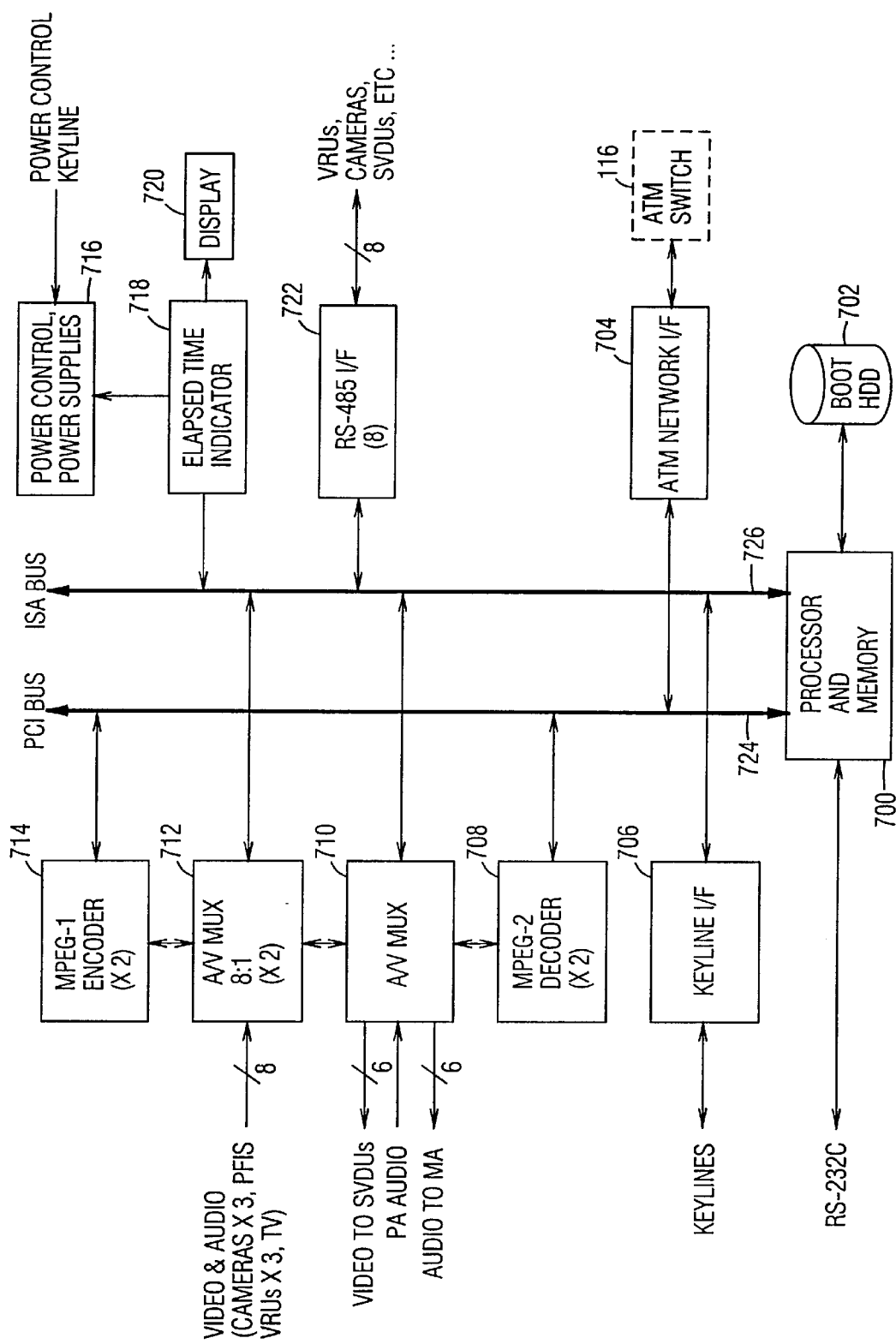
FIG. 7 illustrates a detailed block diagram of the preferred embodiment of the system interface unit.

A detailed block diagram of the system interface unit 118 is illustrated in FIG. 7. A control processor 700 including memory is coupled to both a PCI bus 724 and an ISA bus 726 for communicating with the other components within the system interface unit 118. A hard disk drive 702 is also coupled to the control processor 700. A keyline interface circuit 706 is coupled to the ISA bus 726 to receive and send keyline control signals. An ATM network interface 704 is coupled to the ATM switch 116 and to the PCI bus 724, thereby allowing the system interface unit 118 to communicate over the ATM network. A first audio/video multiplexer 712 is coupled to receive both video and audio data from one or more video cameras positioned on the aircraft, the passenger flight information system, one or more video reproducer units and television signals. The first audio/video multiplexer 712 is also coupled to an MPEG encoder circuit 714 and to the ISA bus 726. The MPEG encoder circuit 714 is coupled to the PCI bus 724. A second audio/video multiplexer 710 is coupled to provide video signals to the one or more smart video distribution units and audio signals to a multiplexed audio interface. The second audio/video multiplexer 710 is also coupled to receive public address system audio signals. The second audio/video multiplexer 710 is further coupled to the first audio/video multiplexer 712, to an MPEG decoder circuit 708 and to the ISA bus 726. The MPEG decoder circuit 708 is coupled to the PCI bus 724. A power control and power supply circuit 716 is coupled to receive power control keyline signals and to provide power to the components within the system interface unit 118. An elapsed time indicator circuit 718 is coupled to the power control and power supply circuit 716, to a display 720 and to the ISA bus 726. An RS-485 standard interface circuit 722 is coupled to communicate with the video reproduce units, cameras and smart video distribution units. The RS-485 standard interface circuit 722 is also coupled to the ISA bus 726. The interfaces that are discussed above are explanatory only, and are related to the new standard aircraft interface. It will be apparent to one of ordinary skill in the art that other appropriate interfaces could be included.

Figure 8:
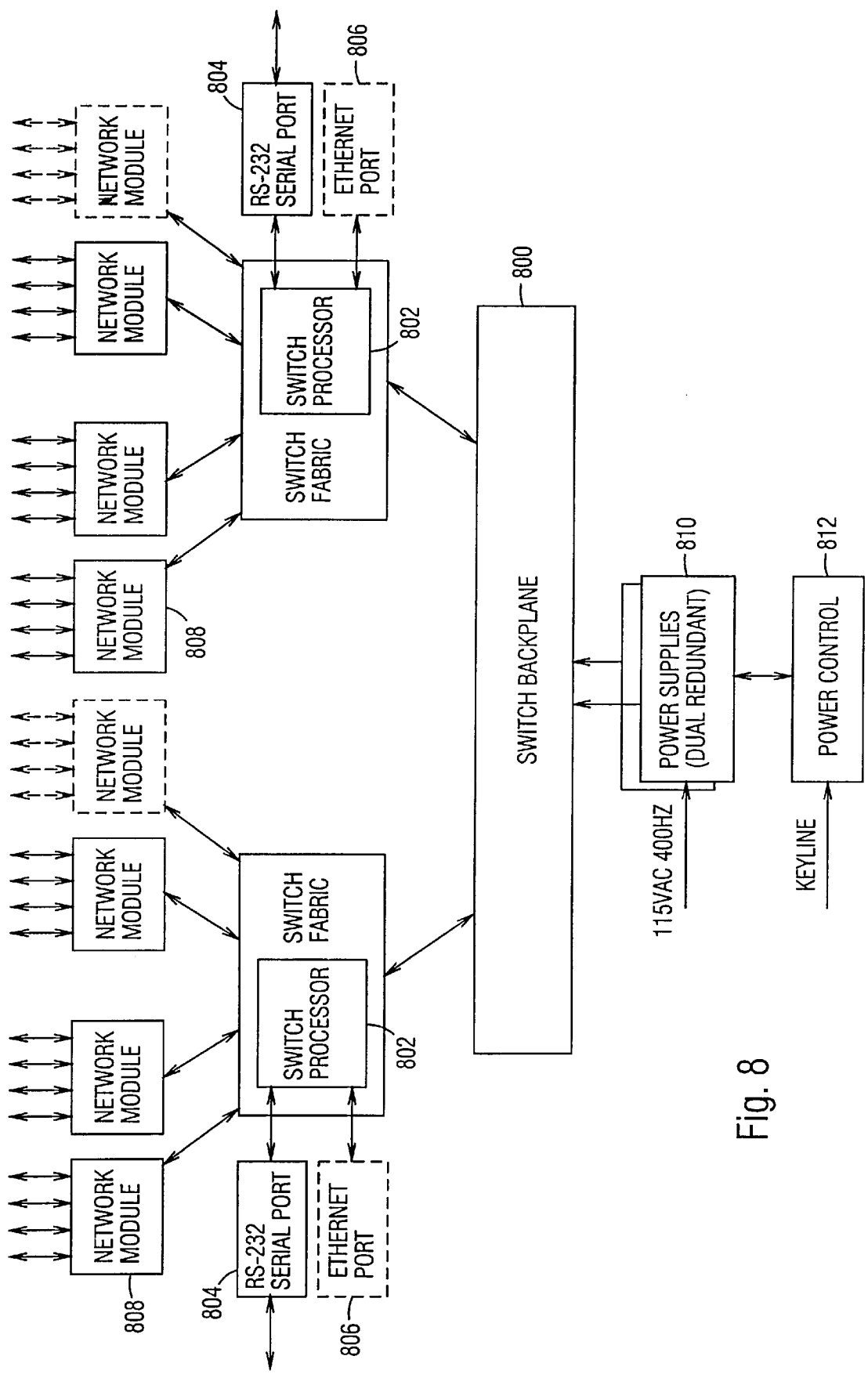
FIG. 8 illustrates a block diagram of the preferred embodiment of the ATM switch circuit.

A block diagram of the ATM switch circuit 116 is illustrated in FIG. 8. A switch backplane 800 is coupled to one or more switch control processors 802. Each switch control processor 802 is coupled to one or more network modules 808, which each include multiple ATM network ports through which communications are transmitted and received. Each ATM port interfaces with an ATM network interface within a component of the system for directing communications over the ATM network. Each network module 808 preferably includes four ATM ports. The switch control processor 802 is also coupled to an RS-232 serial port 804. Alternatively, each switch control processor 802 is coupled to an ethernet port 806. A power control keyline signal is coupled to a power control circuit 812. The power control circuit 812 is coupled to a dual redundant power supply circuit 810. The power supply circuit 810 is coupled to receive a 115 volt AC, 400 Hertz, power line signal. The power supply circuit 810 is also coupled to the switch backplane circuit 800 for providing power to the components within the ATM switch circuit 116. A preferred ATM switch is available from Fore Systems of Warrendale, Pennsylvania. Alternatively, any appropriate ATM switch can be implemented.

The ATM switch 116 is the in-flight entertainment system's central switching fabric for the headend control system's ATM network. The ATM switch 116 is used for data switching between the components of the headend control system and the zone bridge units. The ATM switch 116 is also used for switch call processing and switch maintenance processing. The ATM switch 116 further provides power supply redundancy through the dual redundant power supply circuit 810.

Figure 9:
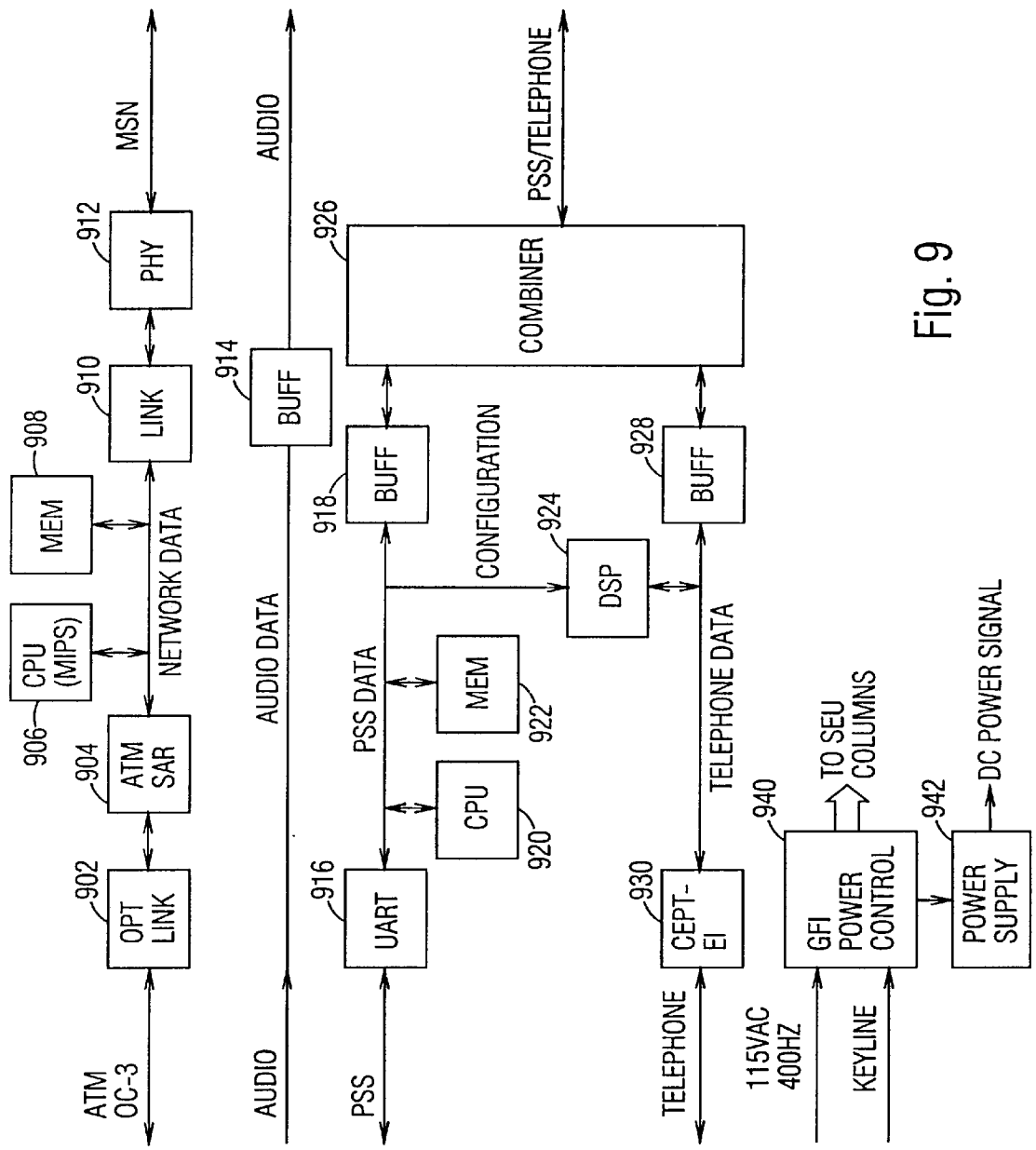
FIG. 9 illustrates a block diagram of the preferred embodiment of the zone bridge unit.

A block diagram of a zone bridge unit is illustrated in FIG. 9. An optical receiver link 902 is coupled to the ATM network for communicating over the network. Preferably, the optical receiver link 902 is coupled to the ATM network by an OC3 fibre optic cable. Alternatively, any appropriate link can be used to couple the optical receiver link 902 to the ATM network. The optical receiver link 902 is coupled to an ATM segmentation and reassembly (SAR) device 904. The ATM SAR 904 is coupled to a control processor 906, to a memory circuit 908 and to a network link circuit 910 for communicating between the ATM network and the seat network. The network link circuit 910 is coupled to the seat network through a physical interface circuit 912 and for sending data to and receiving data from the seat electronic units within the zone. Overhead audio data is provided to the seat network through a buffer 914 within the zone bridge unit. A universal asynchronous receiver transmitter (UART) 916 is coupled to the passenger service system. The UART 916 is coupled to a control processor 920, to a memory circuit 922, to a digital signal processor 924 and to a buffer 918 for controlling communications between the passenger service system and the seat network. The buffer 918 is coupled to a combining circuit 926. Preferably, a CEPT-E1 standard circuit 930 is coupled to the aircraft's telephone system. The CEPT-E1 circuit 930 is coupled to the digital signal processor 924 and to a buffer 928 for controlling telephone communications from within the zone. Alternatively, any appropriate telecommunications link can be coupled to the aircraft's telephone system. The buffer 928 is coupled to the combining circuit 926. The combining circuit 926 is coupled to the seat network for controlling communications to and from the aircraft's passenger service system and telephone system.

A 115 volt, 400 Hertz, AC power line and a power disable keyline control signal are coupled to a power control circuit 940. The power control circuit 940 is coupled to the power supply circuit 942. The power control circuit 940 is coupled to seat electronics units within the zone for providing power signals to the seat electronics units.

Each of the zone bridge units bridge the high speed, fibre optic ATM network at the headend of the system to the IEEE 1394 serial bus seat distribution network for a particular zone within the aircraft. The zone bridge unit is responsible for managing the IEEE 1394 seat distribution network for a zone within the aircraft including the functions of IEEE 1394 bus management and IEEE 1394 bandwidth resource management. The zone bridge unit is further responsible for mapping IEEE 1394 addressing to ATM addressing as well as supporting broadcast and multicast functionality between the ATM network and the IEEE 1394 seat distribution network.

Figure 10:
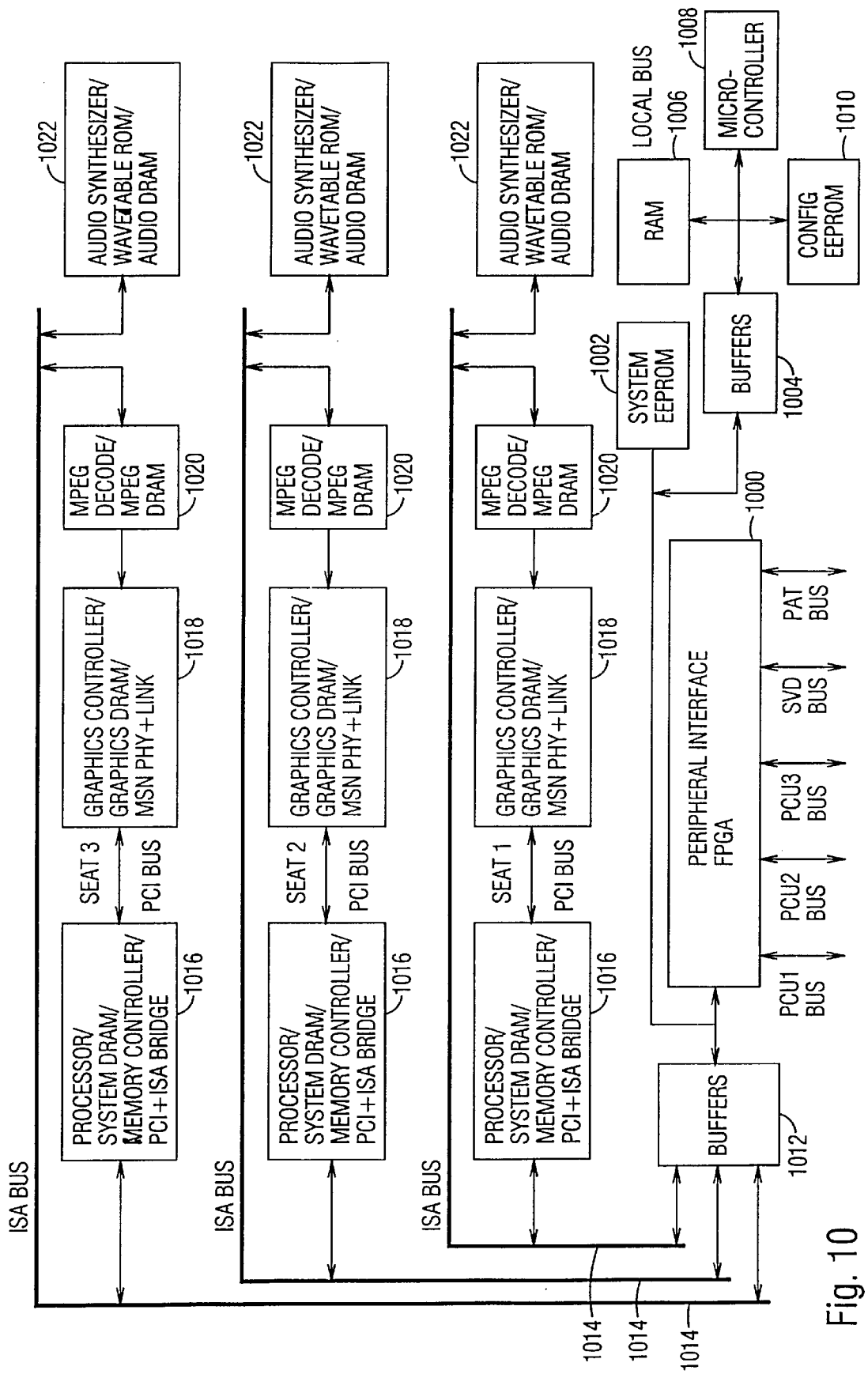
FIG. 10 illustrates a block diagram of a triple seat electronics unit.

A block diagram of a triple seat electronics unit is illustrated in FIG. 10. A peripheral interface 1000 is coupled to a system EEPROM 1002, to a buffer circuit 1004, to a buffer circuit 1012, to a passenger control unit for each of the three seat electronics units, to a video display bus and to a passenger service system, passenger address and telephone bus. The buffer circuit 1004 is coupled to a configuration EEPROM 1010, a RAM 1006 and a microcontroller circuit 1008. The buffer circuit 1012 is coupled to an ISA bus 1014 for each seat electronics unit controlled by the triple seat electronics box. The ISA bus 1014 for each seat electronics unit is coupled to a control processor/system DRAM, memory controller and bus bridge circuit 1016. The ISA bus 1014 for each seat electronics unit is also coupled to a MPEG decode and DRAM circuit 1020 and to an audio synthesizer 1022, including a wavetable ROM and audio DRAM. A graphics controller circuit 1018 is coupled between the control processor/system DRAM, memory controller and bus bridge circuit 1016 and the MPEG decode and DRAM circuit 1020. While, a triple seat electronics unit has been illustrated in FIG. 10 for explanatory purposes, it should be apparent to those skilled in the art that a seat electronics unit could be implemented to provide an interface to any number of passenger sets of seat peripherals.

Figure 11:
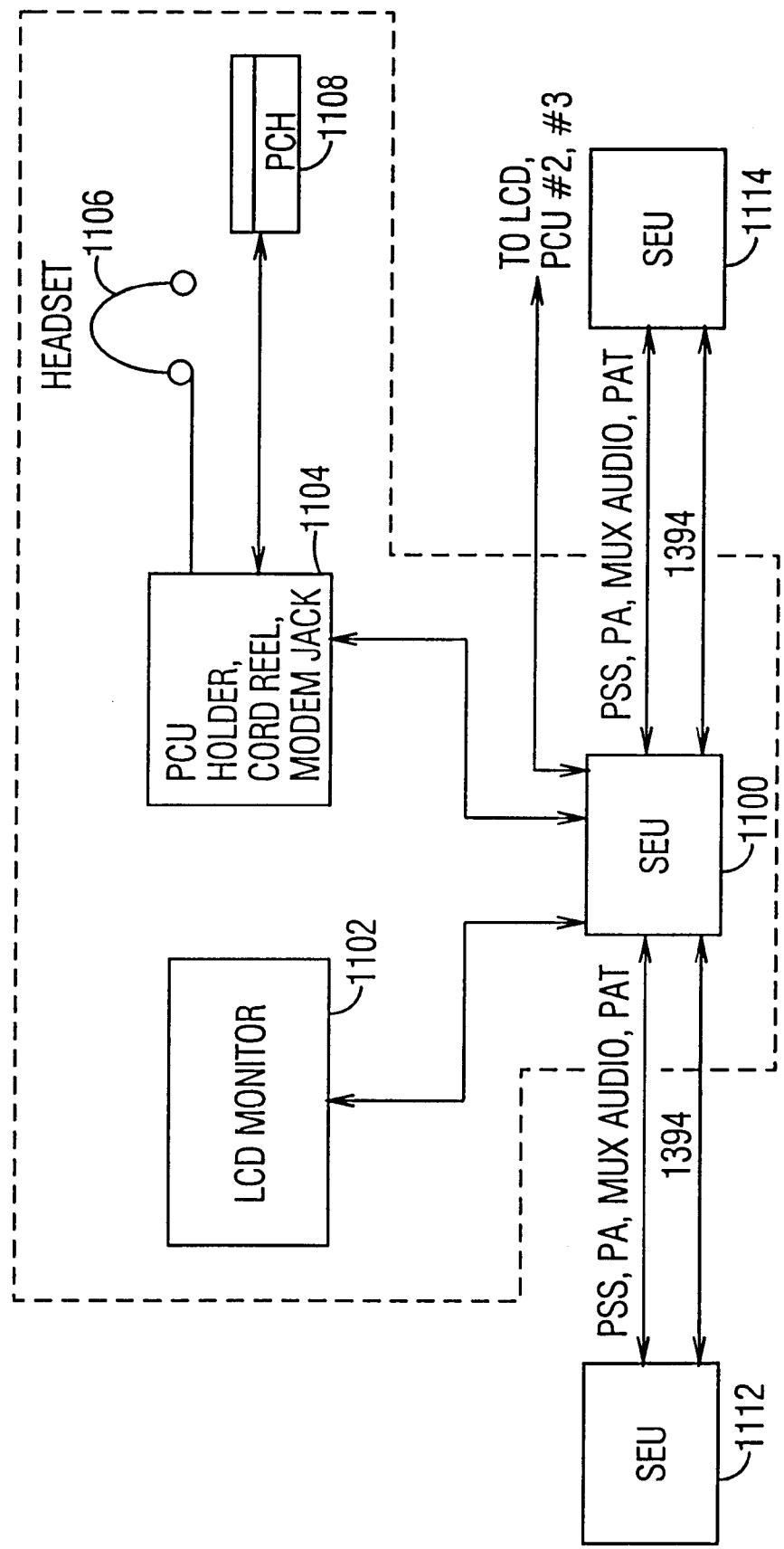
FIG. 11 illustrates a block diagram of a preferred embodiment of a passenger set of seat peripherals.

Each seat electronics unit provides the passenger electronics necessary to fully interface the features of the in-flight entertainment system of the present invention with the passenger at the seat. A block diagram of a seat electronics unit and accompanying peripherals is illustrated in FIG. 11. The seat electronics unit 1100 is also coupled to up to three displays 1102 for providing video and graphics images to the passenger. Preferably, the display 1102 is an LCD. Alternatively, other types of relatively light weight and relatively high brightness and definition displays are acceptable for use with the present invention, including, for example, goggle-type LCD displays such GLASTRON™ sold by Sony Corporation, Tokyo Japan. The seat electronics unit 1100 is further coupled to up to three passenger control units 1104. The passenger control unit 1104 includes a modem jack to which a passenger's personal computer can be coupled. A headset 1106 is coupled to the passenger control unit 1104 for providing audio content to the passenger. While a conventional audio headset is preferred for use as the headset 1106, the audio headset 1106 can alternatively be a noise cancelling headset which includes a power connection to the headset in addition to the audio connections. A personal control handset 1108 is also coupled to the passenger control unit 1104. The personal control handset 1108 is coupled to the passenger control unit 1104 by a cord which is stored within and extends from the seat arm. A preferred passenger control handset 1108 includes an integral game controller, telephone handset and credit card reader. For additional details on one suitable embodiment of the passenger control handset 1108, see U.S. Pat. No. 08/639,287, filed on Apr. 25, 1996 and entitled An Integrated Electronic System Utilizing A Universal Interface To Support Telephone And Other Communication Services. The passenger control handset 1108 is used by the passenger to enter commands and data into the system. The seat electronics unit 1100 is coupled to the neighboring seat electronics units 1112 and 1114.

The seat video display 1102 provides the passenger with an LCD display for viewing personal entertainment data and information service data at their seat. Preferably, the seat video display 1102 is housed within a stowable seat display arm which is rotated out when in use and stored within an arm rest when not in use. Alternatively, the seat video display 1102 is located within the seatback or bulkhead in front of the passenger's seat. The viewing angle, high brightness and high contrast are characteristics which can be adjusted by a user in the preferred embodiment of the seat video display 1102. The data received by the seat electronics unit 1100, over the IEEE 1394 bus, is received in a digital format. Accordingly, the seat electronics unit 1100 includes one or more digital-to-analog converter circuits for converting the received digital data stream, representing the video and audio, to an analog data stream before it is transmitted to either the display 1102 or the headset 1106. While preferably the display is an LCD, other types of relatively light weight and relatively high brightness and definition displays are acceptable for use with the present invention, including, for example, goggle-type LCD displays such GLASTRON™ sold by Sony Corporation, Tokyo Japan. Also, while a conventional audio headset is preferred for use as the headset 1106, the audio headset 1106 can alternatively be a noise cancelling headset which includes a power connection to the headset in addition to the audio connection.

System configuration data is loaded from the floppy disk drive 512 of the system manager unit 114 or the CD Rom drive 604 of the attendant control panel 110 onto the data server 102, thereby forming a software configuration database. Once stored onto the data server 102, the software configuration database is writable to either the CD Rom drive 605 or to the floppy disk drive 512 for troubleshooting. If any configuration data is not loaded, is incorrectly loaded or loading is aborted, an error message will be displayed on the display 536 at the attendant control panel 110.

The system configuration data includes specific cabin management data, expected system configuration, flight information data and billing system inputs. The specific cabin management data includes the data related to the overhead video selection and audio channel assignments, zone programming assignment and aircraft seat class assignment for the flight. The cabin management data also includes the data relating to customer menus and languages, including a greeting menu which is displayed with the airline's colors and logo. Alternatively, the cabin management data will also include the data for inventory management of meals, drinks and duty free items, as well as system usage statistics.

The expected system configuration data includes the data related to the specific hardware and software in use within the aircraft and the configuration of the hardware, including the number of seats, seat boxes, zones, servers and attendant stations and the specific seat arrangement. The flight information data contains the data on the passengers, including the passenger's names, where each passenger is sitting, their frequent flyer number, whether or not they are flying with a group and their pre-authorized spending account balances on the in-flight entertainment system. The billing system inputs include data on the billing system rates, currency exchange rates for international flights, prices of each product and service, list of free products and services and packages of products and services, an encrypted table of invalid credit card numbers and a list of statistics to be collected on use of the system during the flight.

Using the components of the system manager unit 114 and the attendant control panel 110, an attendant can obtain information from the in-flight entertainment system including maintenance data, passenger financial account data, passenger transaction log, system hardware and software identification, system content and configuration data, usage statistics, inventory management data and system error log files. This data can be loaded onto removable electronic media such as a floppy disk using the floppy disk drive 512 or onto a magnetic tape using the magnetic tape drive 606. Alternatively, this data can also be downloaded using an electronic data link. Again, it should be noted that the system of the present invention preferably allows content data to be only uploaded into the system. In order to protect proprietary content programming and prevent unauthorized copying by unscrupulous person, content data cannot be downloaded from the preferred embodiment of the system of the present invention.

Figure 12:
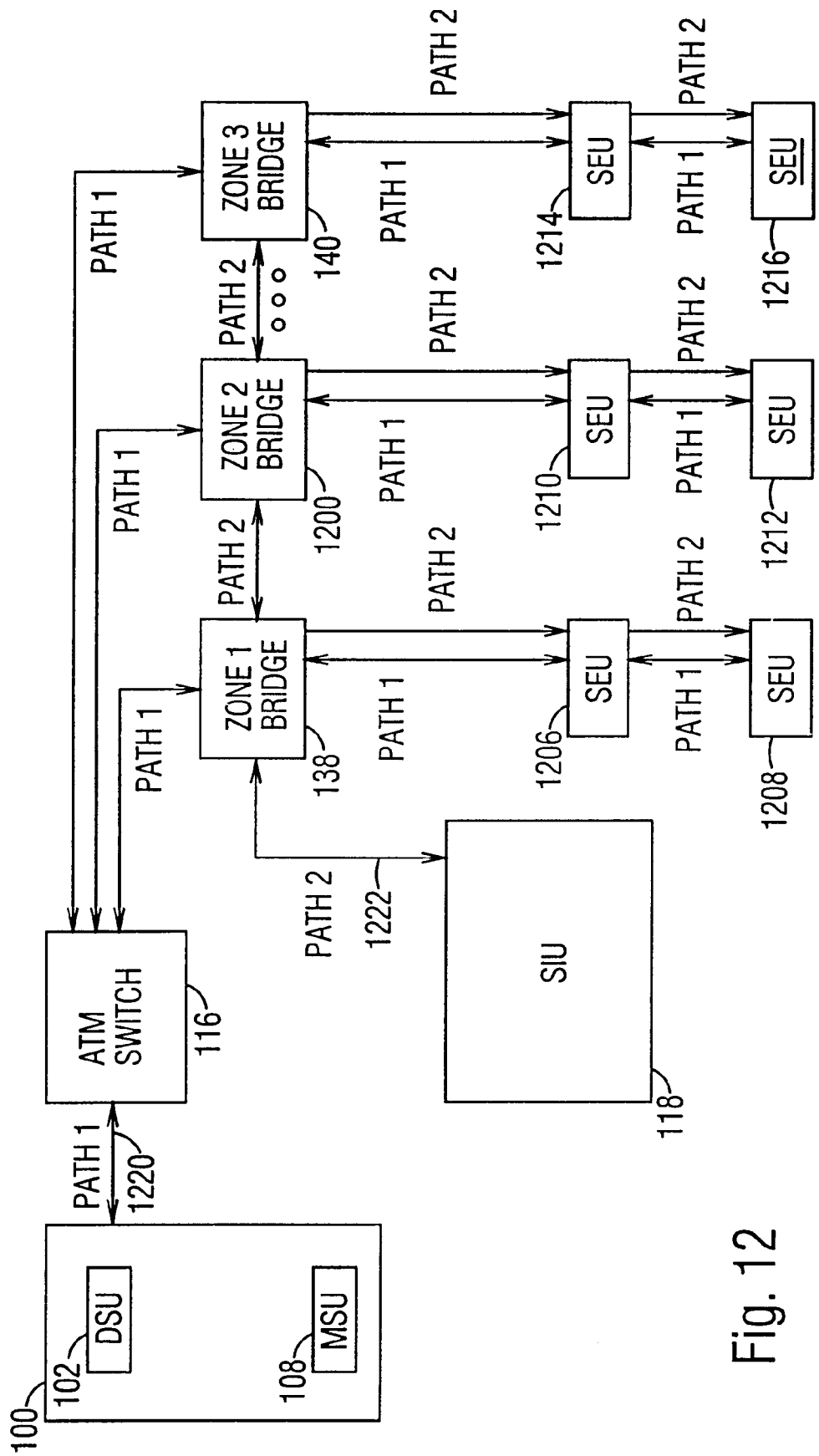
FIG. 12 illustrates an audio distribution path configuration within the in-flight entertainment system of the present invention.

A block diagram showing the audio distribution paths of the entertainment system of the present invention is illustrated in FIG. 12. The first audio distribution path 1220 is routed from the ATM network switch 116 to the headend servers 100 and to each of the zone bridge units 138, 140 and 1200. The second audio distribution path is routed from the system interface unit 118 to each of the zone bridge units 138, 140 and 1200. The first and second audio paths are then routed from the zone bridge units 138, 140 and 1200 to each seat electronics unit within the respective zones.

The first audio path is used to distribute audio content from the media servers 106 and 108 to the seat electronics units. The second audio path is used to distribute audio for the PA system and the overhead system to the seat electronics units. The second audio path is therefore provided to all seat electronics units within the aircraft. The first audio path is provided selectively to zones of the aircraft equipped with the video and audio on demand system. The seat electronics units within zones of the aircraft which are not equipped with the video and audio on demand system are only capable of receiving the audio content from the second audio path. The passengers in these zones will only receive video content from the overhead distribution system. The seat electronics units within zones of the aircraft that are equipped with the video and audio on demand system, are described in detail below, and are capable of receiving audio content from both the first and second audio paths. The seat electronics units within zones of the aircraft equipped with the video and audio on demand system include a display, an audio output, an input device, a telephone handset and a credit card reader, allowing a passenger to have access to audio and video on demand, video games, gambling, telephone service and information services, if implemented in a given embodiment. Seats which only receive audio content from the second path are not equipped with displays, but receive audio content through the second audio path and a set of headphones.

Figure 13:
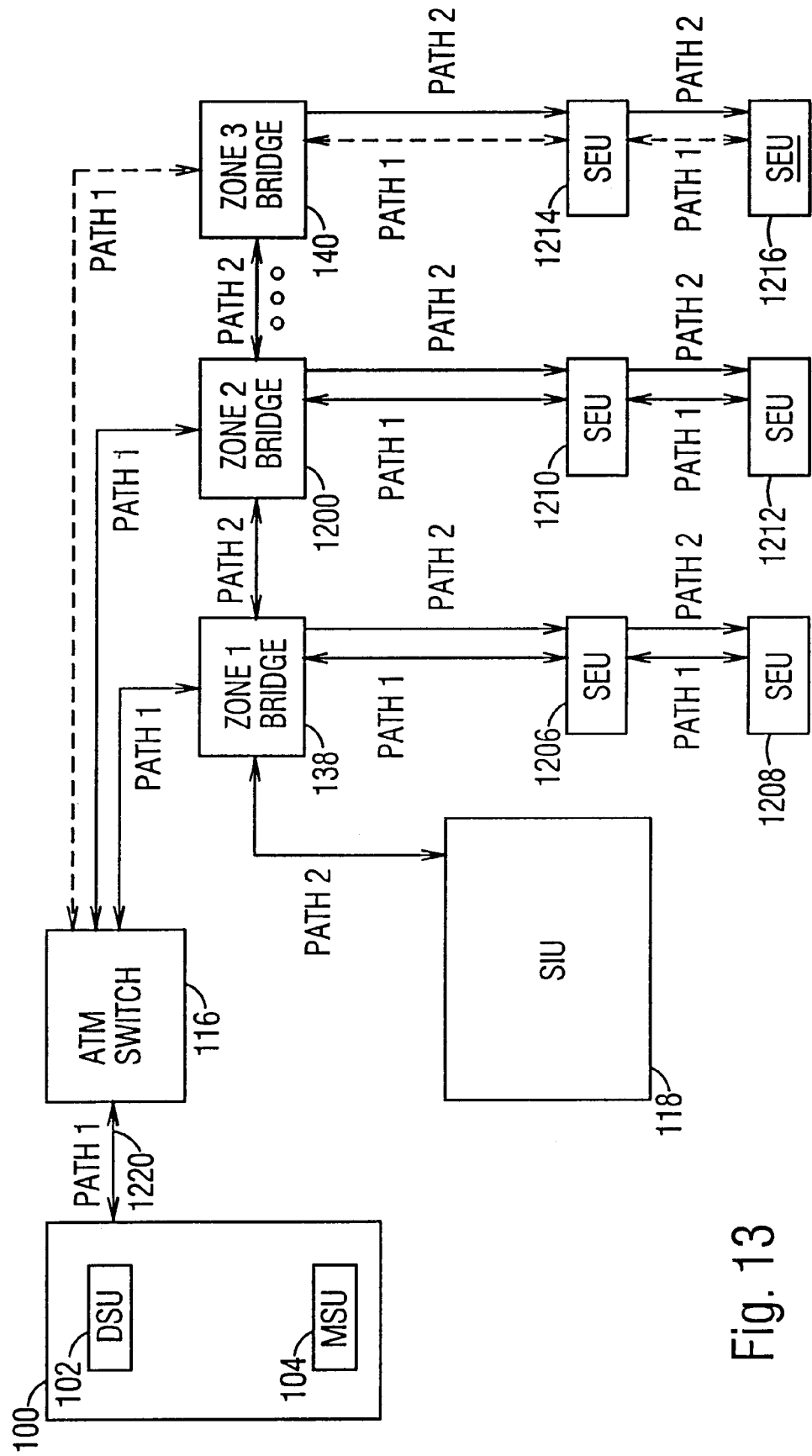
FIG. 13 illustrates an alternate audio distribution path configuration.

A block diagram showing the selective distribution of the first audio path is illustrated in FIG. 13. The distribution of the audio paths are as described above in reference to FIG. 12, with the exception that the first audio path is not provided to the zone 3 bridge unit 140 and the seat electronics units 1214 and 1216 coupled to the zone 3 bridge unit 1204. In this configuration, only the second audio path is provided to the zone 3 bridge unit 1204 and the seat electronics units 1214 and 1216 within that zone. In this manner, the first and second zones of the airplane, which could be first and business class, are provided with both the first and second audio paths. The third zone of the airplane, which could be economy class, is only provided with the second audio path. The passengers within the third zone will therefore only have access to the PA audio and entertainment audio provided from the system interface unit 118, while the passengers within the first and second zones will additionally have access to video and audio content from the media servers 106 and 108, as well as games and interactive services from the data server 102.

Figure 14:
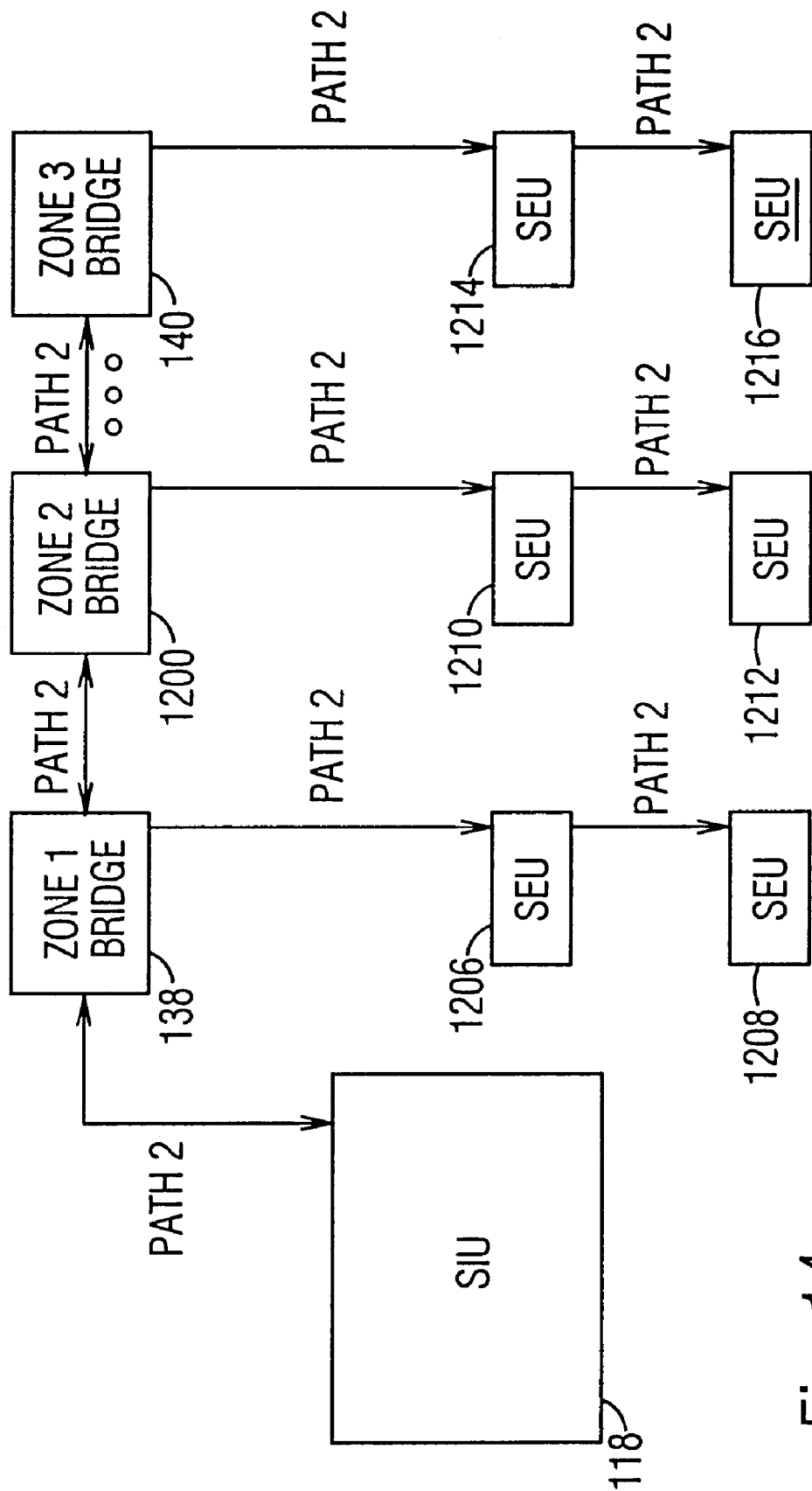
FIG. 14 illustrates an alternate subsystem audio distribution path configuration.

A block diagram showing an implementation of audio distribution within the subsystem of FIG. 15A without on-demand features is illustrated in FIG. 14. In this subsystem only the second audio path from the system interface unit 118 to the zone bridge units 138, 140 and 1200 and then to the seat electronics 1206, 1208, 1210, 1212, 1214 and 1216, is included.

DATA TRANSFERS TO THE SEAT ELECTRONICS UNITS

As described above, an IEEE 1394 network is formed between the zone bridge units and the seat electronics units for the communication of data within the zone. The IEEE standard, "P1394 Standard For A High Performance Serial Bus," Draft 8.01v1, Jun. 16, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. In the in-flight entertainment system of the present invention each seat electronic unit forms a node on the IEEE 1394 bus within its zone.

The in-flight entertainment system of the present invention provides both multicast and broadcast distribution of data to the seat electronics units in addition to the individualized streams of data supporting the video and audio on demand features. Multicast distribution of data is used to deliver common data, such as video from the observation camera or data from the passenger flight information system, to only those passengers who wish to receive it. Broadcast distribution of data is used to deliver public address announcement audio data and video content such as the safety video simultaneously to all of the seats. The broadcast data has priority over any other transfer of data on the network.

When transmitting the broadcast data, especially the safety video, it is important that all of the passengers within the aircraft receive the data stream simultaneously, in order that the video viewed by each passenger is synchronized to any live demonstrations by the flight attendants. Using the ATM network and the ATM switch 116, data broadcast through the ATM switch 116 is synchronized by setting up a multipoint to multipoint connection through the ATM switch 116. The ATM switch 116 combines the time multiplexed data stream coming in on several input ports of the distributed servers within the headend. The ATM switch 116 then copies the data to each output port coupled to a zone bridge unit. Thus, each zone bridge unit only receives a single copy of the broadcast data stream. The broadcast data stream passes through the zone bridge unit which routes the data to the seat network. The IEEE 1394 seat network then broadcasts this stream of data to each seat on each seat column output of the zone bridge unit. This secondary broadcast from the zone bridge unit uses a point to multipoint broadcast connection technique, with each seat electronics unit only seeing one copy of the data stream. This technique eliminates network bottlenecks and allows the server to broadcast a single data stream over an ATM network to all of the seat electronics units in synchronization. The few copies of the data stream within the network avoids flooding the network with stream copies guaranteeing a low distribution latency for the system. Using this multipoint to multipoint virtual channel connection between the headend servers and the seat electronics units, the entire aircraft can receive the same data stream in synchronization.

OPERATION OF THE VIDEO AND AUDIO ON DEMAND FUNCTIONS

The media controller 104 (FIG. 1) is responsible for controlling the delivery of video and audio content data from the media servers 106 and 108 to a seat electronics unit. When a passenger selects a program for viewing or listening, a request is sent to the media controller 104. Once the media controller 104 receives such a request, a play slot is scheduled for the passenger. The media controller 104 then adds the passenger to the play schedule and sends a request to the media servers 106 to output data to the address of the passenger's seat electronics unit. Commands from the passenger, such as stop, pause, fast forward and rewind, are also sent to the media controller 104, which then modifies the play schedule for that passenger appropriately. The media controller 104 maintains a list of the available content on the media servers 106 and 108 which is updated whenever content on the media servers is changed.

Video content on the media servers is preferably stored in MPEG format, with support for multiple languages and subtitle information. The language or subtitle display is selected by the passenger via on screen menus when the video is initially selected. The content data is stored across multiple media servers. Each media server also stores a portion of each program as a redundant data block for fault recovery in the event a single disk should fail. Redundant data blocks are always stored on different media servers from the primary block. Should a disk fail, that part of a program which was stored on the failed disk can be retrieved from the redundant data blocks on the remaining servers.

To play a video or audio program, a passenger makes a selection at their passenger set of seat peripherals. This program request initiates a call setup to the media controller 104. The media controller 104 then schedules the program to be played with the media servers 106 and 108. A program connection to the passenger's set of seat peripherals consists of three virtual channels: one channel is used for transmission of the data stream; another channel is kept open for the transmission of control signals; and a third channel is kept open for ATM network management signals. The content data is read from the media servers 106 and 108 and sent to the ATM switch 116. At the ATM switch 116, the content data arrives on different ports from each media server. The ATM switch 116 then performs a multipoint to point recombination of the content data, thereby creating a single in-sequence data stream which is addressed to the passenger's seat electronics unit.

Content data streams for each seat electronics unit coupled to a zone bridge unit are sent from the ATM switch 116 to the zone bridge unit on a single ATM port, using multiple channels. At the zone bridge unit, the ATM cells for each seat electronics unit are reassembled and segmented into IEEE 1394 packets. The IEEE 1394 packets are then appended with the appropriate destination header and transmitted over the IEEE 1394 network to the appropriate seat electronics unit. At the seat electronics unit, the data is reassembled from the IEEE 1394 packets and sent to the applications within the appropriate passengers set of seat peripherals where the data is extracted from the headers and sent to the MPEG decoder for display.

The video on demand system of the present invention allows a passenger to fast forward and rewind a video program. Note, the term "rewind" is used to relate the present technology to the more familiar video tape technology. If video content is stored on a hard disk, in reality a new start address is selected. However, the form of read and write memory implemented is not critical to the system. These features are supported by only retrieving and displaying MPEG "I" frames which are extracted from the content data using the "I" frame index file, which is also derived from the content data. An MPEG "I" frame is a noncompressed full video frame within the MPEG stream which is used as a reference. When a passenger requests a pause of content, the system will pause all audio and video on demand content playback at the seat electronics unit. After the pause condition is removed, the audio or video content data stream will be resumed.

The audio on demand portion of the system of the present invention also allows a passenger to fast forward and rewind an audio program. Preferably, the in-flight entertainment system allows an airline to provide audio programming from either a jukebox style selection of audio programs, a conventional audio program or station format which plays a particular type of audio programs, or a list of compact disks which can be accessed by the passenger.

The passenger will make selections from menus displayed on the monitor at the seat electronics unit. The passenger is able to point to and select on screen menu options through the use of a cursor control pad on the passenger control unit and a select button. Audio channels are selected from channel selector buttons on the passenger control unit or on screen menus.

OVERHEAD DISPLAY SYSTEM

The overhead display system is driven by the system interface unit 118. The system interface unit 118 drives each of the overhead monitors or projection system through a smart video display unit. Each smart video display unit preferably supports one or two monitor connections, a video feed through connection to another smart video display unit and an RS-485 multidrop digital control connection. The video content signal is driven baseband differential and is rebuffered in each of the smart video display units.

Each smart video display unit group distributes three independent video channels for a total of six videos per system. Video channels are assigned to a specific aircraft zone. Each smart video display unit is instructed which video channel is selected for each display via the RS-485 interface. The system interface unit 118 has a video multiplexer circuit for each of the three outputs. The multiplexer inputs are two video tape recorder channels, one camera channel, one airshow channel, one spare input and a digital video channel. The audio data corresponding to the overhead video data is broadcast for distribution to the passengers at the seats through the audio distribution system, as described above. This audio data is broadcast through the second audio path, from the system interface unit 118 through the zone bridge units 138, 140 and 1200 and then to the seat electronics units. The passengers ultimately receive this audio data from the second audio path, through a set of headphones.

The audio distribution system is used for distribution of public address audio, overhead display system audio and entertainment audio. This audio data is distributed to the seats through the second audio path. The system interface unit 118 is responsible for multiplexing the audio sources to the audio outputs. The public address audio inputs are set up for eight different public address zones, whereby audio messages can be selectively sent to predetermined zones within the aircraft.

The in-flight entertainment system of the present invention will pause all video, audio, game and information services during a cabin wide announcement over the public address system. The system will issue public address override signals upon detection of a public address condition. The system interface unit 118 provides indication of the public address override condition to the seat electronics units and to the attendant control panel 110 within the effected zones via the ATM and IEEE 1394 networks, as well as via the second audio path. The seat electronics units will override entertainment audio with public address audio upon receiving a public address override command.

In this manner, as described above, the in-flight entertainment system of the present invention is used to provide flexibility of entertainment options within an aircraft's cabin by combining use of the seat electronics units and the overhead display system on a zone-by-zone basis. The overhead display system is also used as a backup to the seat electronics units. The audio/video on demand features of the in-flight entertainment system are fully interactive, allowing a passenger to stop, pause, fast forward and rewind, as desired. This allows a passenger to leave their seat and return, without missing a portion of their selected entertainment feature. In contrast to other in-flight entertainment systems, the in-flight entertainment system of the present invention also interfaces with other aircraft systems, allowing the crew or flight attendants to fully monitor the status of the aircraft's systems, as well as enter and extract data relating to inventory management and specific usage patterns of the in-flight entertainment system by the passengers.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. For example, while an ATM network and IEEE 1394 serial bus network have been chosen for use in the preferred embodiment, it will be apparent that other types of networks could alternatively be used for communications between the components of the in-flight entertainment system of the present invention. It will also be apparent that the entertainment system of the present invention can also be readily adapted for operation in environments other than aircraft, including but not limited to other transportation modes, e.g. train, bus, ferry and cruise ship.

We claim:

1. An audio distribution system for distributing audio content to one or more passengers on an aircraft comprising:

a. one or more media servers for storing predetermined content data;

b. one or more control sets through which a passenger receives content data;

c. a routing device coupled to the one or more media servers and to a first predetermined number of the control sets, thereby forming a first audio path for routing audio content from the media servers to the first predetermined number of control sets; and d. a system interface unit coupled to the control sets and for interfacing to existing systems on the aircraft including a PA system, thereby forming a second audio path for routing audio content from the system interface unit to the control sets.

2. The audio distribution system as claimed in claim 1 wherein the system interface unit is also coupled to an overhead display system.

3. The audio distribution system as claimed in claim 2 further comprising one or more zone bridge units, each coupled to the routing device, to the system interface unit and to a second predetermined number of control sets, thereby forming a zone within the aircraft.

4. The audio distribution system as claimed in claim 3 wherein the media servers, the system interface unit and the routing device are coupled together within a first digital network and the zone bridge units and the control sets are coupled together within a second digital network.

5. The audio distribution system as claimed in claim 4 wherein the first digital network is an ATM network and the second digital network is an IEEE 1394 serial bus network.

6. The audio distribution system as claimed in claim 1 further comprising one or more audio content players coupled to the system interface unit for providing audio content to the control sets through the second audio path.

7. The audio distribution system as claimed in claim 1 wherein a PA message overrides all other audio content and is simultaneously transmitted to all control sets through the second audio path.

8. An in-flight entertainment system for providing content to one or more passengers on an aircraft comprising:

a. one or more media servers for storing predetermined content data;

b. one or more control sets through which a passenger receives content data;

c. one or more zone bridge units each coupled to a first predetermined number of control sets thereby forming zones within the aircraft;

d. a routing device coupled to the media servers and to a second predetermined number of the control sets through selected zone bridge units, thereby forming a first audio path for routing audio content from the media servers to the second predetermined number of control sets; and e. a system interface unit coupled to all of the control sets through the zone bridge units and configured for interfacing to existing systems on the aircraft including a PA system, thereby forming a second audio path for routing audio content from the system interface unit to the control sets.

9. The in-flight entertainment system as claimed in claim 8 wherein each of the second predetermined number of the control sets includes a display, an audio output and an input device for entering controls and playing content data received from the media servers.

10. The in-flight entertainment system as claimed in claim 9 wherein each input device further includes means for making a telephone call.

11. The in-flight entertainment system as claimed in claim 9 wherein the system interface unit is also coupled to an overhead display system.

12. The in-flight entertainment system as claimed in claim 11 wherein the media servers, the system interface unit and the routing device are coupled together within a first digital network and the zone bridge units and the output units are coupled together within a second digital network.

13. The in-flight entertainment system as claimed in claim 12 wherein the first digital network is an ATM network and the second digital network is an IEEE 1394 serial bus network.

14. The in-flight entertainment system as claimed in claim 13 further comprising a media controller coupled to the first digital network for controlling and scheduling communications from the first digital network to the second digital network.

15. The in-flight entertainment system as claimed in claim 14 wherein each control set includes a digital to analog conversion circuit for converting communications received over the second digital network to analog signals, as necessary for appropriately controlling operation of the display and audio output.

16. The in-flight entertainment system as claimed in claim 15 wherein the predetermined content data includes video programs, audio, games and information services.

17. The in-flight entertainment system as claimed in claim 16 wherein each control set further comprises a telecommunications interface for personal telephony functions.

18. The in-flight entertainment system as claimed in claim 17 further comprising a card reader for securing payment by one of a credit card, smart card and debit card from a user for content played and telephone calls made on a control set.

19. A passenger audio distribution system for distributing audio content to one or more passengers on an aircraft, comprising:
 a. a first means for storing audio content;
 b. a plurality of means for accessing audio content, each for use by passengers for accessing the audio content, the plurality of means for accessing audio content coupled within a first network;
 c. first means for routing audio content coupled to the first means for storing audio content within a second network, and to a first predetermined number of the plurality of means for accessing audio content for routing audio content between the first means for storing audio content and the first predetermined number of the plurality of means for accessing audio content, over the first and second networks, thereby forming a first audio path for routing audio content from the first means for storing audio content to the first predetermined number of the plurality of means for accessing audio content; and
 d. second means for routing audio content coupled to the plurality of means for accessing audio content and to a means for addressing passengers, thereby forming a second audio path for routing audio content from the second means for routing audio content to the plurality of means for accessing audio content.

20. The passenger audio distribution system as claimed in claim 19 wherein the second means for routing audio content is a system interface unit and is further coupled to an overhead display system.

21. The passenger audio distribution system as claimed in claim 20 further comprising a second means for storing audio content coupled to the system interface unit for providing audio content to the plurality of means for accessing audio content through the second audio path.

22. The passenger audio distribution system as claimed in claim 21 further comprising one or more zone bridge units, each coupled to the first means for routing audio content, to the system interface unit and to a second predetermined number of the plurality of means for accessing audio content, thereby forming a zone within the aircraft.

23. The passenger audio distribution system as claimed in claim 22 wherein the first means for storing audio content, the system interface unit and the first means for routing audio content are coupled together within a first digital network and the zone bridge units and the means for accessing audio content are coupled together within a second digital network.

24. The passenger audio distribution system as claimed in claim 23 wherein the first digital network is an ATM network and the second digital network is an IEEE 1394 serial bus network.

* * * * *